US009697630B2

(12) United States Patent
Shintani et al.

(10) Patent No.: US 9,697,630 B2
(45) Date of Patent: Jul. 4, 2017

(54) SIGN LANGUAGE WINDOW USING PICTURE-IN-PICTURE

(71) Applicant: SONY CORPORATION, Tokyo (JP)

(72) Inventors: Peter Shintani, San Diego, CA (US); Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 14/503,621

(22) Filed: Oct. 1, 2014

(65) Prior Publication Data

US 2016/0098850 A1 Apr. 7, 2016

(51) Int. Cl.

| | |
|---|---|
| ***H04N 5/445*** | (2011.01) |
| ***G06T 11/60*** | (2006.01) |
| ***G09B 21/00*** | (2006.01) |
| ***G06F 3/0484*** | (2013.01) |

(52) U.S. Cl.

CPC ............ *G06T 11/60* (2013.01); *G06F 3/0484* (2013.01); *G09B 21/009* (2013.01)

(58) Field of Classification Search

None

See application file for complete search history.

(56) References Cited

U.S. PATENT DOCUMENTS

| | | | |
|---|---|---|---|
| 4,546,383 | A | 10/1985 | Abramatic |
| 5,805,700 | A | 9/1998 | Nardone et al. |
| 5,953,693 | A | 9/1999 | Sakiyama et al. |
| 6,415,031 | B1 | 7/2002 | Colligan et al. |
| 6,460,056 | B1 | 10/2002 | Horri |
| 6,976,166 | B2 | 12/2005 | Herley et al. |
| 7,260,829 | B1 | 8/2007 | Hendricks et al. |
| 7,319,753 | B2 | 1/2008 | Candelore et al. |
| 7,692,722 | B2 | 4/2010 | Kim |
| 7,765,567 | B2 | 7/2010 | Candelore et al. |
| 7,823,174 | B2 | 10/2010 | Candelore et al. |
| 7,882,517 | B2 | 2/2011 | Candelore et al. |
| 7,992,167 | B2 | 8/2011 | Candelore et al. |
| 8,041,190 | B2 | 10/2011 | Candelore et al. |
| 8,051,443 | B2 | 11/2011 | Candelore et al. |

(Continued)

FOREIGN PATENT DOCUMENTS

| | | |
|---|---|---|
| WO | 0031964 | 6/2000 |

OTHER PUBLICATIONS

NIDCD Fact Sheet | Hearing and Balance; "American Sign Language"; National Institute on Deafness and Other Communication Disorders; NIH; Feb. 2014.

(Continued)

*Primary Examiner* — Brian Yenke
*Assistant Examiner* — Samira Monshi
(74) *Attorney, Agent, or Firm* — John L. Rogitz

(57) ABSTRACT

Content substitution and/or picture-in-picture technology is used to provide a sign language window that provides a sign language interpretation of audio content in main program audio/video content. The sign language window can be selectively disabled by a user that does not wish to view the sign language video. Also, in some implementations, the user can move the sign language window to a desired location on the display. The desired location may be one of a plurality of pre-defined display locations. This abstract is not to be considered limiting, since other embodiments may deviate from the features described in this abstract.

21 Claims, 26 Drawing Sheets

(56) References Cited

U.S. PATENT DOCUMENTS 8,208,799 B2 6/2012 Phan
8,392,942 B2 3/2013 Candelore et al.
8,435,172 B2 5/2013 Banik et al.
8,453,172 B2 5/2013 Candelore et al.
8,566,075 B1 10/2013 Bruner
8,645,988 B2 2/2014 Candelore
8,667,525 B2 3/2014 Candelore
8,745,661 B2 6/2014 Ellis et al.
8,755,568 B2 6/2014 Adhikari
2002/0108035 A1 8/2002 Herley et al.
2002/0112066 A1 8/2002 Agraharam et al.
2002/0140719 A1 10/2002 Amir et al.
2002/0150239 A1 10/2002 Carny et al.
2003/0090711 A1* 5/2003 Yoshii ................ H04N 5/44504 358/1.15
2004/0136532 A1 7/2004 Pinder et al.
2004/0184523 A1* 9/2004 Dawson ............ H04N 7/17318 375/240.1
2005/0068977 A1* 3/2005 Na ......................... H04H 20/28 370/432
2005/0108778 A1* 5/2005 Stone ................. H04N 5/44591 725/138
2005/0134739 A1* 6/2005 Bian .................. H04N 5/44504 348/600
2006/0136976 A1 6/2006 Coupe et al.
2006/0170824 A1* 8/2006 Johnson ............ H04N 5/44504 348/569
2007/0040898 A1 2/2007 Lee et al.
2007/0186269 A1* 8/2007 Malik ................ H04N 7/17318 725/135
2008/0016526 A1 1/2008 Asmussen
2008/0267588 A1* 10/2008 Iwase ..................... G11B 20/10 386/248
2009/0271843 A1 10/2009 Hai et al.
2011/0096232 A1* 4/2011 Dewa ................... G09B 21/009 348/468
2012/0081515 A1 4/2012 Jang
2013/0106682 A1 5/2013 Davis et al.
2013/0160048 A1* 6/2013 Cho ..................... H04N 21/816 725/32
2014/0046661 A1 2/2014 Bruner
2014/0111687 A1 4/2014 Difrancesco et al.
2014/0112506 A1 4/2014 Hopkins
2015/0181208 A1 6/2015 Park et al.

OTHER PUBLICATIONS

"Broadcom Announces Breakthrough Cable HD Set-Top Box Solutions"; Press Release; Broadcom; Mar. 21, 2013.
"BCM 7584—Broadcom Announces Breakthrough Cable HD Set-Top Box Solutions", Broadcom; Date unknown; downloaded Jul. 31, 2014.
Peter Shintani, Brant Candelore, "Selective Enablement of Sign Language Display", related U.S. Appl. No. 14/503,574 non-final office action dated May 10, 2016.
Peter Shintani, Brant Candelore, "Selective Sign Language Location", related U.S. Appl. No. 14/503,548 non-final office action dated May 11, 2016.
Peter Shintani, Brant Candelore, "Selective Sign Language Location", file history of related U.S. Appl. No. 14/503,548, filed Oct. 1, 2014.
Peter Shintani, Brant Candelore, "Selective Enablement of Sign Language Display", file history of related U.S. Appl. No. 14/503,754, filed Oct. 1, 2014.
Peter Shintani, Brant Candelore, "Selective Sign Language Location", related pending U.S. Appl. No. 14/503,548, applicant's response to non-final office action filed Jun. 20, 2016.
Peter Shintani, Brant Candelore,"Selective Enablement of Sign Language Display", related pending U.S. Appl. No. 14/503,574, applicant's response to non-final office action filed May 13, 2016.
Peter Shintani, Brant Candelore, "Selective Sign Language Location", related pending U.S. Appl. No. 14/503,548, Applicant's response to non-final office action filed Oct. 12, 2016.
Peter Shintani, Brant Candelore, "Selective Enablement of Sign Language Display", related U.S. Appl. No. 14/503,574, Final Office Action dated Dec. 1, 2016.
Peter Shintani, Brant Candelore, "Selective Enablement of Sign Language Display", related U.S. Appl. No. 14/503,574, Applicant's response to Final Office Action filed Dec. 5, 2016.
Peter Shintani, Brant Candelore, "Selective Sign Language Location", related U.S. Appl. No. 14/503,548, Non-Final Office Action dated Sep. 30, 2016.

* cited by examiner 100
104
SIGN LANGUAGE WINDOW LOCATION #1
120
SIGN LANGUAGE WINDOW LOCATION #2
122
SIGN LANGUAGE WINDOW LOCATION #3
124
SIGN LANGUAGE WINDOW LOCATION #4
126
127

100
104
120
122
124
126
128

156
I, P OR B - MACRO-BLOCK
I, P OR B - MACRO-BLOCK
198
I-MACRO-BLOCK
199
194
I-MACRO-BLOCK
I-MACRO-BLOCK
I-MACRO-BLOCK
I-MACRO-BLOCK
190
I-MACRO-BLOCK
I-MACRO-BLOCK
I-MACRO-BLOCK
I-MACRO-BLOCK
196
I-MACRO-BLOCK
120

216
FROM 212
RECEIVE MACROBLOCK
250
SLW BOUNDARY MB?
254
YES
NO
NO RE-ENCODING / OUTPUT MACROBLOCK
258
NEXT MB
262
BOUNDARY?
266
RIGHT
LEFT
I-MACROBLOCK?
270
YES
NO
RE-ENCODE MACROBLOCK AS I-MACROBLOCK
274
OUTPUT RE-ENCODED MACROBLOCK
278
I-MACROBLOCK?
282
YES
NO
RE-ENCODE MACROBLOCK AS I MACROBLOCK
286

216
FROM 212
RECEIVE MACROBLOCK
250
SLW BOUNDARY MB?
254
NO
YES
NO RE-ENCODING / OUTPUT MACROBLOCK
258
NEXT MB
262
BOUNDARY?
266
RIGHT
LEFT
I-MACROBLOCK?
270
YES
NO
RE-ENCODE MACROBLOCK AS I-MACROBLOCK
274
OUTPUT RE-ENCODED MACROBLOCK
278
I-MACROBLOCK?
282
YES
NO
B-MACROBLOCK?
290
YES
NO
RE-ENCODE MACROBLOCK AS I MACROBLOCK
286

220
FROM 216
300
RECEIVE MACROBLOCK
304
SLW BOUNDARY MB?
YES
NO
308
NO RE-ENCODING / OUTPUT MACROBLOCK
312
NEXT MB
316
BOUNDARY?
LEFT
RIGHT
320
I-MACROBLOCK?
YES
NO
324
RE-ENCODE MACROBLOCK AS I-MACROBLOCK
328
OUTPUT RE-ENCODED MACROBLOCK
332
B-MACROBLOCK?
YES
NO
336
RE-ENCODE MACROBLOCK AS I MACROBLOCK

PROCESSOR
458
USER INTERFACE / SIGN WINDOW REGION SELECTION
462
SIGN LANGUAGE VIDEO WINDOW BUFFER
454
PID REMAPPER
466
CONTENT REPLACEMENT STATE MACHINE
470
474
SL PID
SI
MAIN VIDEO PID
450
424

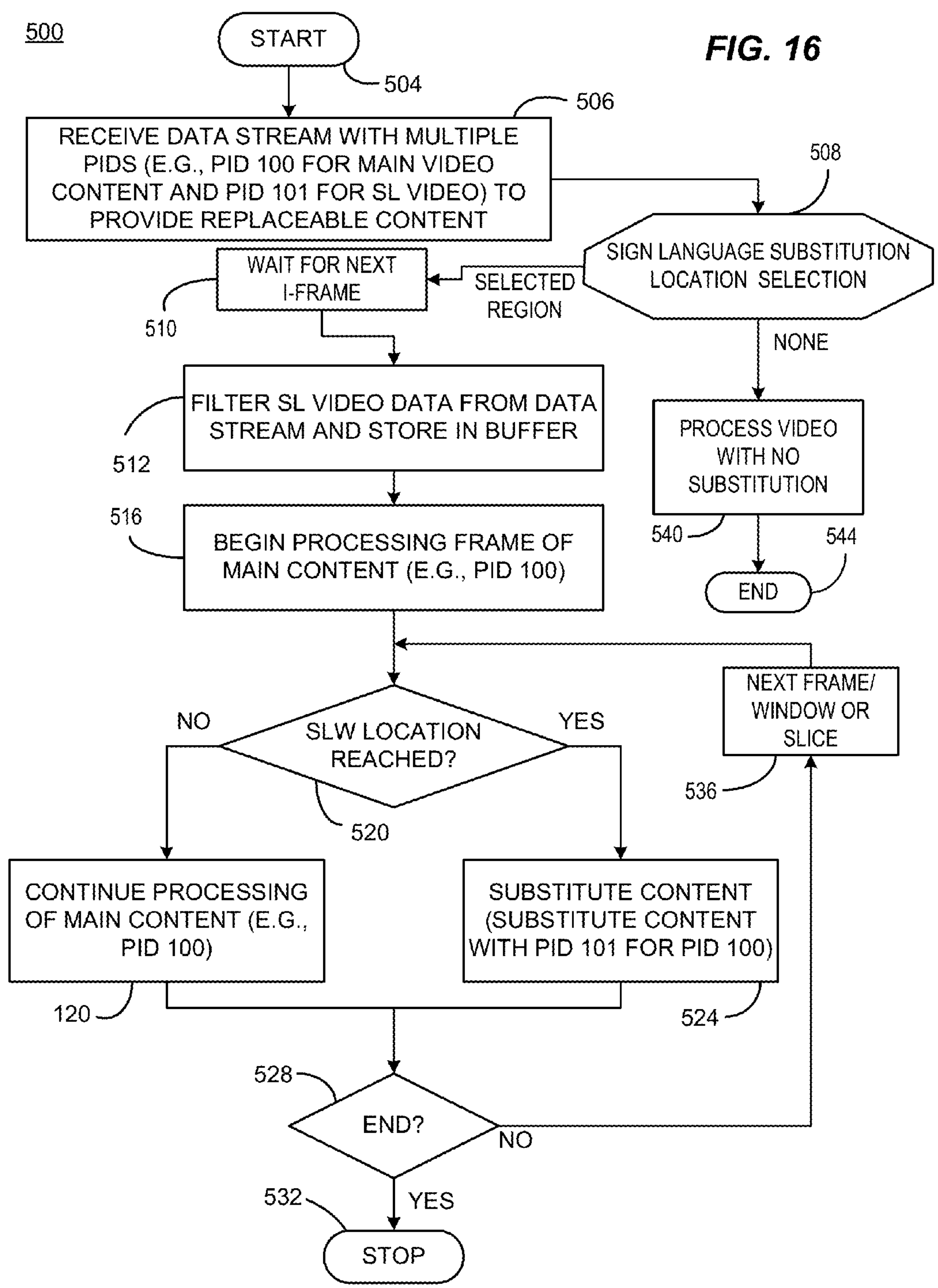

500
START
504
FIG. 16
506
RECEIVE DATA STREAM WITH MULTIPLE PIDS (E.G., PID 100 FOR MAIN VIDEO CONTENT AND PID 101 FOR SL VIDEO) TO PROVIDE REPLACEABLE CONTENT
508
SIGN LANGUAGE SUBSTITUTION LOCATION SELECTION
SELECTED REGION
WAIT FOR NEXT I-FRAME
510
NONE
FILTER SL VIDEO DATA FROM DATA STREAM AND STORE IN BUFFER
512
PROCESS VIDEO WITH NO SUBSTITUTION
516
BEGIN PROCESSING FRAME OF MAIN CONTENT (E.G., PID 100)
540
544
END
NEXT FRAME/ WINDOW OR SLICE
NO
SLW LOCATION REACHED?
YES
536
520
CONTINUE PROCESSING OF MAIN CONTENT (E.G., PID 100)
SUBSTITUTE CONTENT (SUBSTITUTE CONTENT WITH PID 101 FOR PID 100)
120
524
528
END?
NO
532
YES
STOP

470
CONFIG. PID FILTERS
INITIAL STATE
650
STATE 1: WAIT FOR PACKET
652
654
ONE FOR ONE INSERTION
668
666
670
STATE 2B: WAIT FOR PACKET
674
MULTI FOR ONE INSERTION/ DELETION
676
672
STATE 3: WAIT FOR PACKET
678
656
664
658
STATE 2A: WAIT FOR PACKET
ONE FOR ONE SUBSTITUTION
660
662

ENCODER SIDE
1000
1004
ADAPTATION FIELD-PRIVATE DATA
PRIVATE DATA{APPLICATION 1, LOCATION x, 8 BYTES}
1008
1024
1028
PID A
1032
SL PID A
8 BYTE BUFFER
1020
PID REMAPPER
1016
SL PID B
1012
DECODER SIDE

SIGN LANGUAGE WINDOW USING PICTURE-IN-PICTURE

CROSS REFERENCE TO RELATED DOCUMENTS

This application is related to U.S. Pat. Nos. 7,319,753; 7,765,567; 7,823,174; 7,882,517; 7,992,167; 8,051,443; 8,041,190; 8,392,942; 8,435,172; 8,453,172; 8,645,988; and 8,667,525, all to Candelore, et al. and are assigned in whole or in part to the assignee of the present application. This application is also related to U.S. patent application Ser. Nos. 14/503,508 and 14/503,574, entitled "SELECTIVE SIGN LANGUAGE LOCATION" and "SELECTIVE ENABLEMENT OF SIGN LANGUAGE DISPLAY" respectively, both to Shintani and Candelore, and both of which were filed of even date herewith. Each of these patents and applications are hereby incorporated herein in their entirety by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Closed captioning has been used in both analog and digital television systems to enable the hearing impaired to read captions of television dialog to more readily access television programming. The Advanced Television Systems Committee (ATSC) standard 3.0 is being developed to incorporate more advanced provisions to accommodate users with various sensory disabilities.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 16 is a flow chart of an example process of sign language content substitution consistent with certain example embodiments of the present invention.

GLOSSARY

Figure 1:
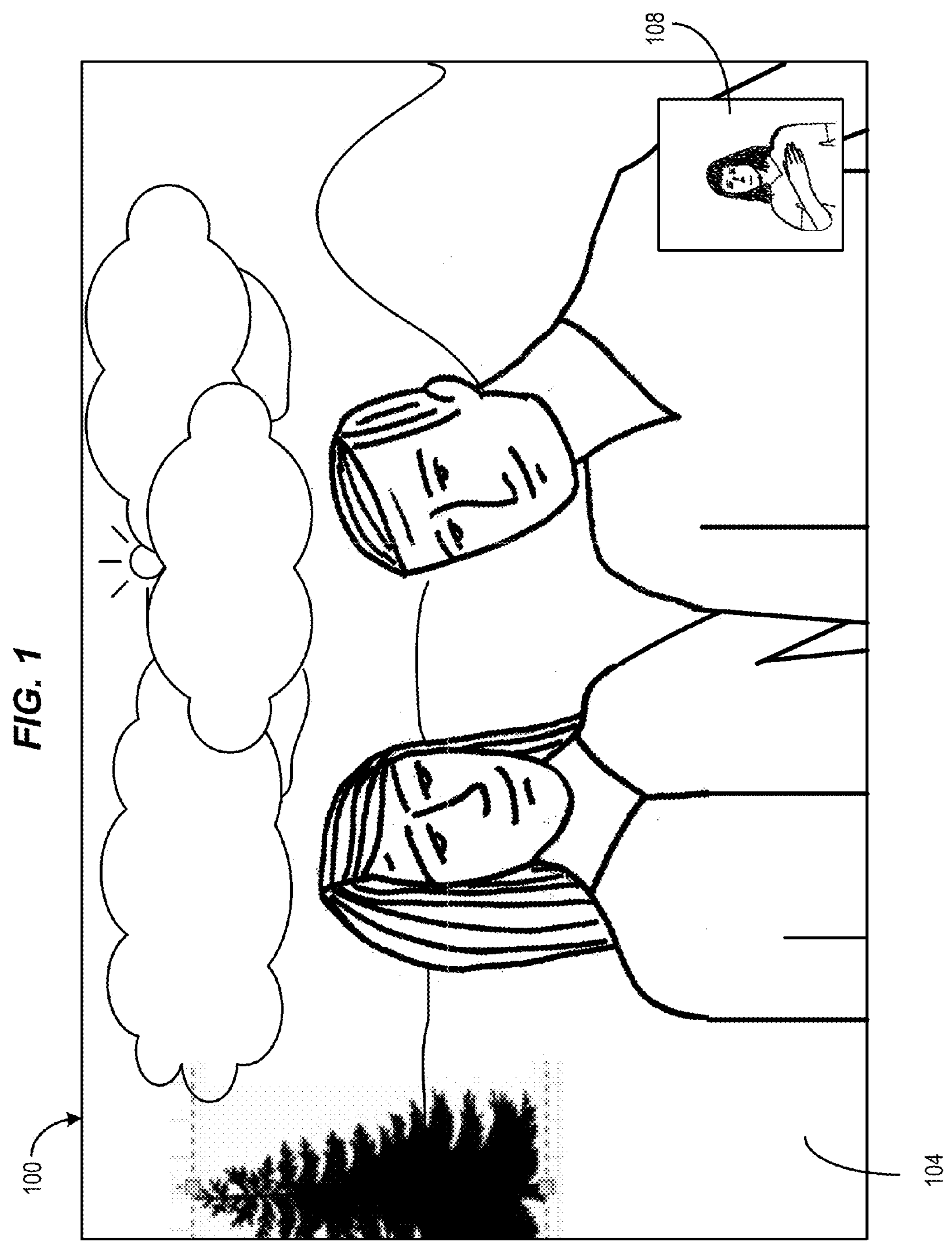
FIG. 1 illustrates a video display with a sign language window.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

The term "coupled", as used herein, is defined as connected, although not necessarily directly, and not necessarily mechanically.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an app, a widget, an applet, a servlet, a source code, an object code, a sketch, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "non-transitory" as used herein is intended to describe a storage medium that excludes signals and propagation media. Examples include disk storage, optical storage, read only memory, flash memory, and random access memory. The term non-transitory is intended only to preclude propagating waves and not storage that can be rewritten or storage that loses its stored information when power is removed.

The term "program", as used herein, may also be used in a second context (the above definition being for the first context). In the second context, the term is used in the sense of a "television program" or "show". This term is applicable without regard for delivery method (e.g., broadcast, cable, satellite, Internet, etc.). In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like unified content which may not be reported as a program in an electronic program guide. Also, the terms "program" and "television program" and "program content" and similar terms can be interpreted in the normal conversational sense, as well as a meaning wherein the term means any segment of A/V content that can be displayed on a television display or similar monitor device.

The term "set-top box" or "STB" is synonymous with the term "set-top terminal" and is used in the manner conventionally used in the cable television industry as a television component that provides for demodulation and decoding of television information received via the cable television infrastructure. The term extends to satellite, internet and broadcast television devices that serve similar purposes.

The term "receiver device" as used herein is used as a generic term for devices that serve as receivers, decoders, etc. for television programming or similar audio/video content, including but not limited to television sets, television receivers, cable or satellite set-top boxes or terminals, TV receiver modules, Internet Protocol television receiver/decoder devices, Digital Video Recorders having tuners or which otherwise access television audio/video content, etc.

The term "video" may be used herein to include not only true visual information, but also in the conversational sense (e.g., "video tape recorder") and may embrace not only pure video signals but also video signals packaged along with associated audio, control and other data.

The term "video frame" or "frame" means a single video frame of data as would occupy a progressive encoded display for one complete pass of rendering, e.g., from top left to bottom right.

The term "video sub-frame" or "sub-frame" means a complete freestanding image within a frame of video such as the rendering of a sign language window containing sign language video as discussed in this document.

The term "package medium" and similar terms as used herein are intended to embrace a recording medium such as a Digital Versatile Disc (DVD), Compact Disc (CD) or other magnetic, optical or other recorded medium that is generally merchandised as a package that contains the electronic storage medium and is sold as a retail commodity, as contrasted to an electronically downloadable data stream.

The term "Sign Language" means a so-called "deaf sign language" including village and community sign languages. Sign languages are languages of gestures (usually hand and arm gestures) that are used as a communication language that substitutes for or augments speech and lip reading for the benefit of the hearing impaired. Sign language is intended to mean gestures used to communicate or improve communication non-verbally with the hearing impaired. Examples include, but are not limited to standard American Sign Language and various shorthand extensions thereof, whether or not the signs are standardized and universally recognized in view of regional variations and differences based on language, location, and other factors that contribute to differences in the various sign languages.

The term "Sign Language Window" (SLW) means a window-like display within a displayed image that contains, or is designated to contain, sign language video content.

The term "macroblock" is used to mean an object formed from a collection of one or more blocks of data which are used to produce a video picture. This terminology is consistent with use of the term in the various MPEG (Moving Pictures Expert Group) video standards as well as AVC (Advanced Video Coding), but is not limited thereto in that the term can also be interpreted to read upon equivalent structures defined in other standards.

The term "content substitution" or "content replacement" means substitution of video content as displayed on a display with other content for at least a portion of the display.

The term "packet identifier" or "PID" is used in the manner consistent with conventional usage in MPEG Program and System Protocol (PSIP), but can equivalently mean data constructs that are used in the same manner as PSIP PIDs.

The term "I-frame" means an inter-coded video frame consistent with the use in various MPEG standards. An I-frame is a frame of video that is freestanding and not dependent upon video data from adjacent or nearby video frames.

The term "P-frame" is an intra-coded predictive video frame that is used in MPEG and other video compression techniques to create a full video frame by reference to a preceding frame and by predicting missing data.

The term "B-frame" is an intra-coded bi-directional video frame that is used in MPEG and other video compression techniques to create a full video frame by reference to video frames preceding and following the B-frame.

The term "I-packet" is used herein to mean a packet carrying at least a portion of an I-frame.

The term "I-macroblock" is intended to mean a video macroblock that that contains either only I-packets or is otherwise not reliant upon video data residing outside the macroblock. That is, the macroblock may include P or B data within the macroblock, but is not reliant upon other data outside the macroblock.

The term "P-macroblock" and "B-macroblock" refers to macroblocks that are intra-coded using data from other macroblocks.

The term "I-encoded location" or "inter-coded location" or the like is used herein to mean a region in a video frame that is encoded such that each slice of the location starts and ends with an I-macroblock or is otherwise encoded so as to render the location self-contained and not dependent upon data residing outside the location either spatially or temporally.

DETAILED DESCRIPTION

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The above-referenced commonly owned patents describe inventions relating to various aspects of methods generally referred to as content substitution and apparatus therefor.

Some people who are hearing impaired may prefer sign language over closed captioning. In some scenarios closed captioning may not be an option. One issue with display of a sign language window in normal television programming is that, like closed captioning, some people may find it very distracting if they are viewers who don't require it. A sign language window also takes up part of the display screen and may cover up or obscure the main content.

Referring to FIG. 1, some television programming (for example, an emergency news conference or a speech) is broadcast using a window within the main content shown on the display 100 that includes an interpreter translating the spoken words into sign language. This is illustrated by way of example in FIG. 1. The main content 104 is provided in the main viewing area of the display 100. A sign language translator appears in a sign language window (SLW) 108 translating the dialog into a sign language such as, for example, American Sign Language. However, this can be distracting to those who are not in need of the sign language interpretation. Since this content is conventionally embedded at the origin, the viewer cannot disable the sign language or move the sign language to a preferred location. It would be desirable to be able to turn the sign language window on or off as needed or desired. This way, those requiring the sign language can see it and others can turn it off if not needed when no hearing impaired viewers are consuming the main content.

In order to distinguish between the two or more types of digital television content signals, i.e., between the main video content and a secondary content containing an image that provides sign language interpretation of the audio, multiple packet identifiers (e.g., MPEG compliant PIDs) can be utilized. Normally a single set of packet identifiers is used to identify a particular television program. The television receiver device then remaps all of the appropriate video content to a single PID or a single collection of PIDS for playback.

Certain embodiments consistent with the present invention utilizes multiple PIDs associated with substitutable macroblocks of content as a mechanism to provide content substitution that enables display of a sign language window (SLW) along with the main content. The sign language window may be enabled, disabled or specified to reside in one of a plurality of designated locations on the display. This can be accomplished using the present teachings without need for a significant increase in bandwidth and at reasonable hardware cost.

In one aspect consistent with the present teachings, in-frame "packet swapping" as described in the above-referenced patents is adapted to allow for substitution of sign language content for a portion of the main content when desired or turning off the sign language content if not desired or required for accessibility. In this aspect, the content creator creates main content and sign language content for substitution into one or more predefined regions of the display screen. The main content and sign language content are interwoven in a merged stream of content.

In another aspect, which will be discussed first in this document, the main content being replaced is not fixed to a single particular location on the screen. Rather than have main content packets and sign language content "replacement" packets be interwoven, the replacement data are sent ahead of data in the frame they would be replacing. Such replacement packets are "frame synchronized" to one or more possible locations at the time of encoding. In other embodiments, the location can be fixed to a single location, but in either case the sign language window can be turned on or off.

As noted above, video can be created to have an inset picture embedded in the video which shows a person communicating with sign language. But, there is no user control that permits showing or omitting the sign language since it is processed to be a part of the main program content. In accord with the present teachings, an efficient arrangement is provided for sign language support to video which is under user control. A sign language window will only be visible when users wish to see the sign language window; otherwise the window is not visible and the image contains normal main video program content. This effectively provides for a user to enable a program version with sign language (for hearing impaired) and a version without sign language (for non-hearing impaired). In certain embodiments, the location of the sign language window can be changed by the user.

Figure 2:
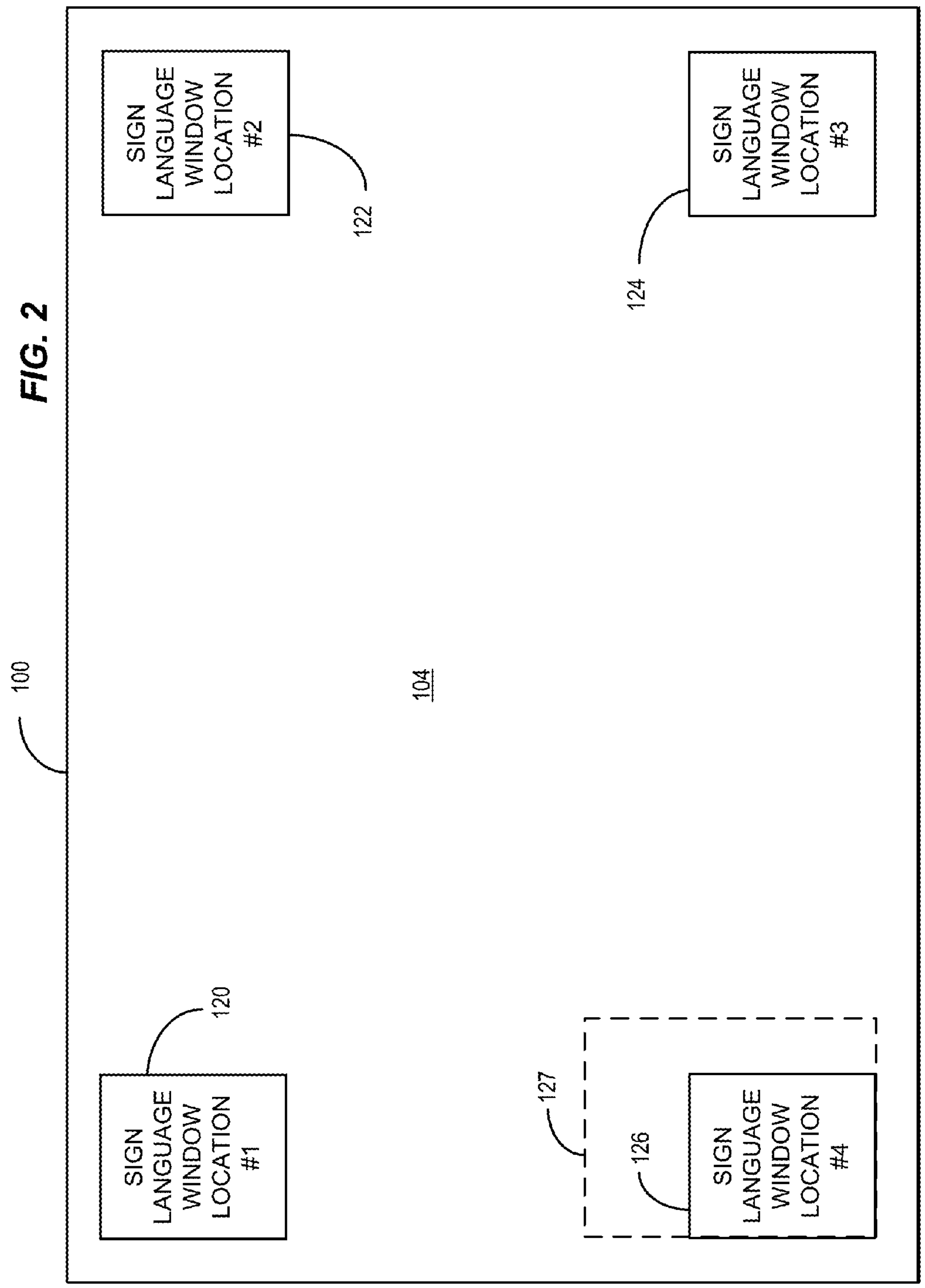
FIG. 2 is an example illustration of a display having multiple sign language window locations in a manner consistent with certain example embodiments of the present invention.

Referring to FIG. 2, using a technique of packet substitution, one or more regions of the main video content 104 displayed on display 100 are provided which correspond to selectable locations where the main content can be replaced with a sign language window (SLW) that incorporates synchronized sign language content. In this example, four possible locations are provided for sign language window locations #1, 2, 3 and 4 situated at locations 120, 122, 124 and 126. In one example, the location can be chosen by the viewer from among pre-defined locations replacing the main video content at any of a plurality of prescribed locations on screen. There is no need to send two full video streams, i.e., one for the typical viewer and another for the viewer who needs sign language. Only certain main content macro-blocks or other segments of data in the video frames are replaced. Hence, there is no need to send two full video streams and thereby minimizing consumption of bandwidth.

Using packet/content substitution approaches, only the data used to represent the video of the sign language is sent in addition to the main video content. This data represents only a fraction of the data of a full frame of main program video content. When the user turns on the sign language, packet swapping is enabled and the packets corresponding to the sign language location of the original video are replaced with those of the sign language region. Since this sign language video might only occupy about 10-15% of the video image that is displayed, the amount of additional data that are used to support this sign language window image is comparatively small.

In certain implementations consistent with the present teachings, one or more of the window locations could also overlap as with window 128, shown in broken lines, which permits the viewer to select a larger window location for display of the sign language. In FIG. 2, location 127 is a larger window that overlaps all or a portion of window location 126, and is the only larger window shown. However, one or multiple windows of the same or multiple sizes and locations can be provided without departing from the present teachings. If multiple sizes of windows are provided for, the sign language video can be upscaled or downscaled at the player device to fit either the larger or smaller window size.

As depicted in FIG. 2, five possible locations are depicted that can serve as locations for the sign language window (only four of which will be depicted and discussed in later drawings for ease of illustration). When electing to enable a sign language window, a sign language window can be substituted for any of the locations or a last location on the screen that showed a sign language window, or a default location. The position of the sign language can be moved around based what is showing for the main content. In some cases, a viewer may wish to position the sign language right next to characters on screen or out of the way, e.g., in the lower right quadrant.

In certain implementations, a processor calculates where the viewer wants to place the sign language content. To accomplish this, slices of main macro-blocks of the main content that reside in locations where the sign language content may be located are terminated with the new macro-blocks inserted in their place. When display of the sign language content is done, the slices of main content macro-blocks are restarted. This can be accomplished in one example on a video slice-by-slice, packet-by-packet or location-by-location basis. In the present implementation, this can be accomplished using I-macro-blocks. The sign language macroblocks may be inserted at the location of main content macro-blocks that are within the locations that are predefined. The sign language content can be encoded as I-macro-blocks or at the least first macro-block can be an I-macro-block that does not utilize any spatial or temporal macroblocks outside the location (e.g., does not use macro-blocks of the main content that are presented immediately prior to the start of using the sign language window). Similarly, the first macroblock of main content following (spatially) the window location is also an I-macro-block.

In certain aspects, the transport process assembling the final version of the content can create syntactically correct encoding so that glitches are avoided. Calculations are done in order to splice in the sign language content.

In the example of FIG. 2, several locations for placement of the sign language window (SLW) on screen are pre-defined. In those locations the main program content macro-blocks start with an I-macro-block and the segment could run for a defined number of macro-blocks which need not be all I-macro-blocks. When the border of the location is reached, another main content I-macro-block may be sent.

In any case, a single video decoder can be used on the receiving end which can be advantageous from a licensing perspective since license costs often depend on the number of decoders that are implemented at a given receiver. Thus, two separate full video streams and decoders are not required. The viewer has the ability selectively view the video as is or with sign language. Hence, a viewer who does not wish to view the sign language window can turn off the window and those who wish to see the sign language window can turn on the window.

The following is a discussion to make it easier for a transport processor to make a swap of content "anywhere" on screen. But, in the present example, the sign language can be situated in one of four designated locations. The main content in those locations would with I-macro-blocks on each line and then terminates with an I-macro-block to start the remaining line after the splice. Bracketing the content to be replaced with I-macro-blocks would make real-time deletion and splicing (content replacement) easier to do for a "non-decoder" process. The procedure of this example constrains the encoder to compress content in a manner that produces I-macroblocks in the designated locations.

Those skilled in the art will appreciate that in certain embodiments, the I-macroblocks could also be created from conventionally encoded video at the receiver device so as to permit the SLW to appear at any desired location by re-encoding the video to provide for the I-macroblocks. Other variations will occur to those skilled in the art upon consideration of the present teachings.

Referring now back to FIG. 2, (ignoring location 127) in this example implementation, four regions are designated as possible locations for the sign language window for the display 100. In this example case, for generality, four possible locations are provided near the four corners of the display 100. Sign language window #1 appears at 120. Sign language window #2 appears at 122. Sign language window #3 appears at 124. Sign language window #4 appears at 126. In this example, the user can elect, e.g., by remote control commands or a menu selection, to either display or not display the SLW; and, if displayed, to designate one of the four SLW locations in which to display the sign language interpreter. In one example, a sign language button/key can be provided on the remote controller and a sequence of presses of the button cycles through enabling in location #1, enabling in location #2, enabling in location #3, enabling in location #4 and disabling. Other arrangements are also possible including using navigation commands to move from one location to another or using menus to designate a preferred location. Other variations will occur to those skilled in the art upon consideration of the present teachings.

In certain MPEG and other digital video implementations (e.g, such as AVC, ATSC and HEVC, the main content packets to be replaced can be tagged with private data in the adaptation field. Each packet to be replaced can have an adaptation field or the first packet followed by a length parameter can be provided that would signal that a certain number of packets would be replaced after the first packet. In one example, the following syntax can be used to define which of the four possible locations are to be used.

| Syntax | No. of bits | Mnemonic |
|---|---|---|
| Transport_private_data( ){ | | |
| If (transport_private_data_length > 0) { | | |
| Decoder application | 16 | uimsbf |
| If (decoder application == '1') { | | |
| Reserved | 12 | |
| Location_1 | 1 | |
| Location_2 | 1 | |
| Location_3 | 1 | |
| Location_4 | 1 | |
| } | | |
| } | | |
| } | | |

The packet would only have one of the locations set to "1". The sign language packets can be stored in a buffer, and a one-for-one replacement of packets—one packet from the sign language buffer for one packet in the stream (containing I-macroblocks) can be carried out. A higher level application responds to a user interface where a person can turn-on sign language and pick a location i.e.,—Location_1, Location_2, Location_3 or Location_4; and further can elect to enable or disable the SLW. The transport processor looks at the adaptation field of each packet to see what type of packet it is (what location it is in) to determine whether or not a substitution should be made.

Figures 3A, 3B, 3C, 3D, 3E, 3F:
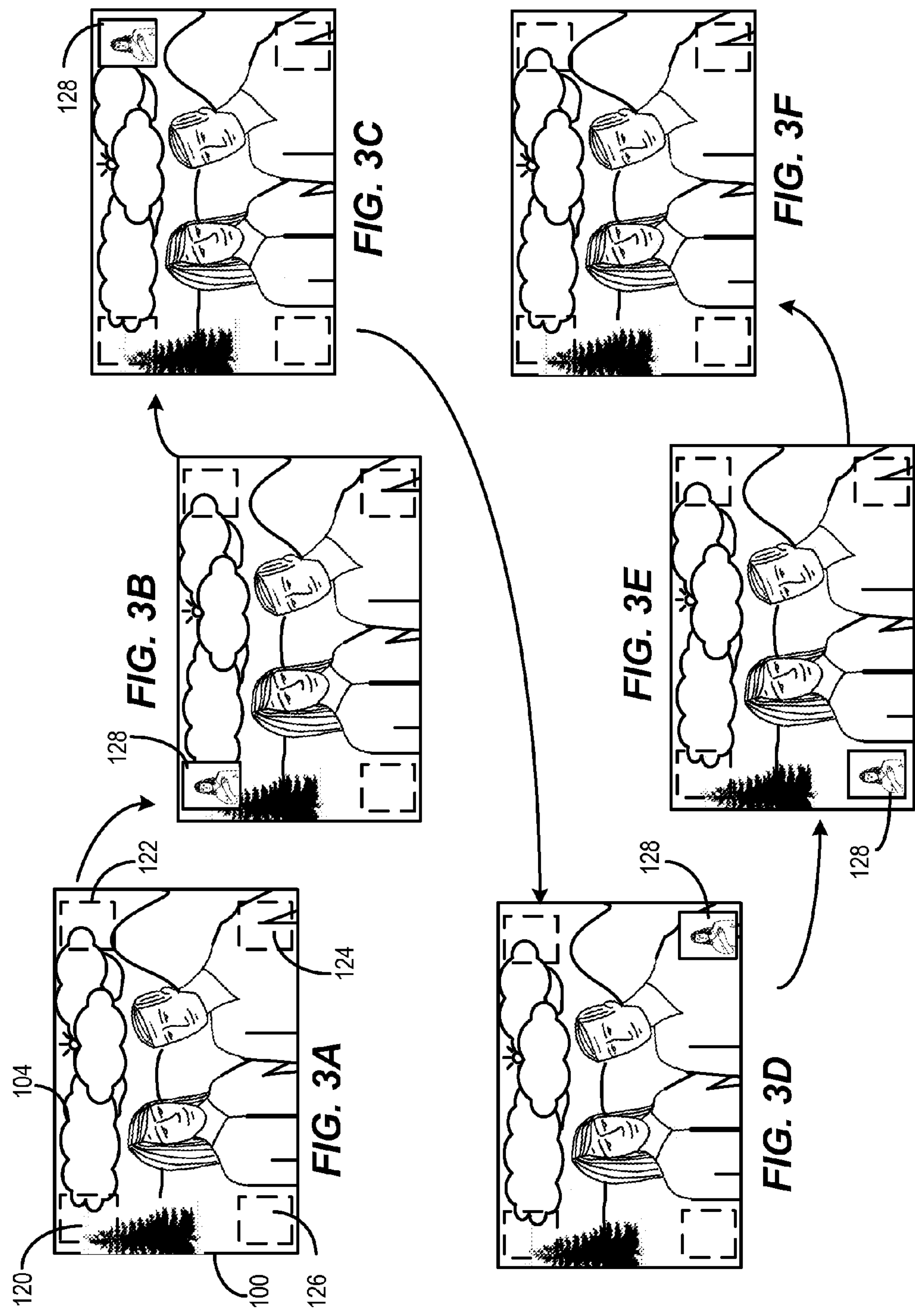
FIG. 3, which is made up of FIG. 3A through FIG. 3F, is an example illustration of a mechanism for cycling between multiple sign language window locations as well as turning sign language windows on and off in a manner consistent with certain example embodiments of the present invention.

With reference to FIG. 3, which is made up of FIG. 3A-3F an example of an operational process is depicted in which the user cycles the position and activation or deactivation using the remote control as described. In FIG. 3A, the sign language window is turned off, but each of the four example locations for the sign language windows 120, 122, 124 and 126 are shown in dashed lines for reference. Upon actuation of the sign language control (in whatever form) the sign language video content 128 appears at location #1—120 as shown in FIG. 3B. The location can then be cycled, e.g., using navigation controls or repeated pressing of the remote control sign language key, etc., to select a location to which the sign language video is moved. In this example, the sign language is moved to presentation at location #2—122 as depicted in FIG. 3C. A further actuation or navigation action can then be used to move the sign language video to location #3—124 as shown in FIG. 3D. A further actuation or navigation action can then be used to move the sign language video to location #4—126 as shown in FIG. 3E. Finally, a further actuation or navigation action turns off the sign language window video. It is to be understood that the dashed boxes shown in these figures are for reference only and are not displayed.

In other embodiments, a user may directly select a location or select a location without cycling through all possibilities. Or, the user may designate a default location that is preferred by that user and always display the sign language in that location. Other variations will occur to those skilled in the art upon consideration of the present teachings.

Figure 4:
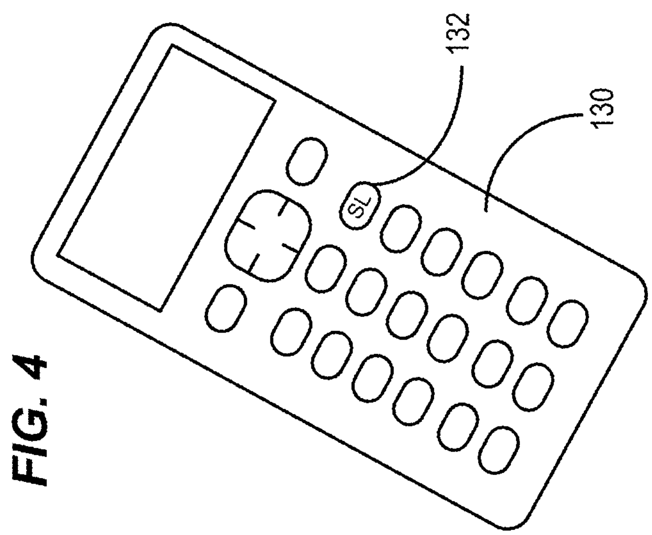
FIG. 4 illustrates an example remote controller having a sign language control key consistent with certain example embodiments of the present invention.

FIG. 4 depicts a remote controller 130 having a remote control button 132 reserved for the above action which is labeled in this example "SL". Repetitive selection of the SL button 132 can cycle through the operation of the display device to activate, deactivate and relocate the sign language windows as depicted in the example flow chart of FIG. 5. In other embodiments, other control mechanisms can be provided.

Figure 5:
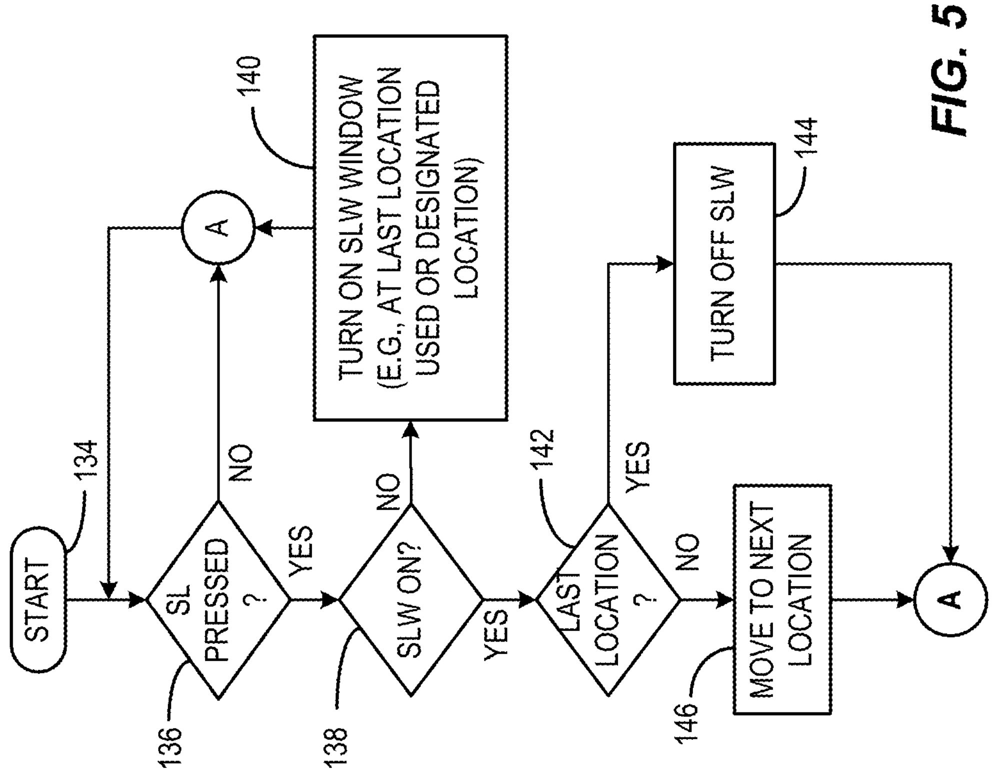
FIG. 5 is an illustrative process of cycling through multiple locations of a sign language window as well as on and off control consistent with certain example embodiments of the present invention.

In FIG. 5, the process starts at 134 after which the system awaits receipt of a signal from the remote controller 130 via a remote controller receiver indicating that the sign language (SL) key has been pressed at 136. When pressed at 136, the system determines if the SLW is on at 138 and if not then the pressing of the SL key is interpreted to mean that the SLW is to be turned on and this is done at 140 with the location of the window being either a designated first window, a designated default window, the user's preferred window location as designated in a menu or at setup, or the last window location used, for example. When the SLW is on at 138, after a SL key press at 136, the process determines at 142 if the location is the last location in the sequence of SLW display locations. If so, the signal is interpreted as a signal to turn off the SLW at 144 and the process returns to 136 to await the next SL button press. If at 142, the SLW location is not the last in the sequence, the process moves the SLW to the next location at 146 in the sequence and the process returns to 136.

This is but one illustrative example technique that can be used to enable and disable the sign language window and position the window about the display. In other embodiments, a default position can be selected from a user menu and various locations can be disabled so as to effectively make the SL button an ON/OFF control. Similarly, in other embodiments, once the SLW is turned on, navigation controls such as up, down, left and right controls or a touchpad or joystick could be used to identify the desired location of the SLW. For example, the SLW can be highlighted on the display for a period of time after enabling, during which time navigation controls are effective. In certain embodiments, execution of a navigation control can extend the time that the navigation controls are active. In other embodiments, the navigation controls can be active until an "enter" key is activated or the SL key is activated again. Many variations will occur to those skilled in the art upon consideration of the present teachings.

Figure 6:
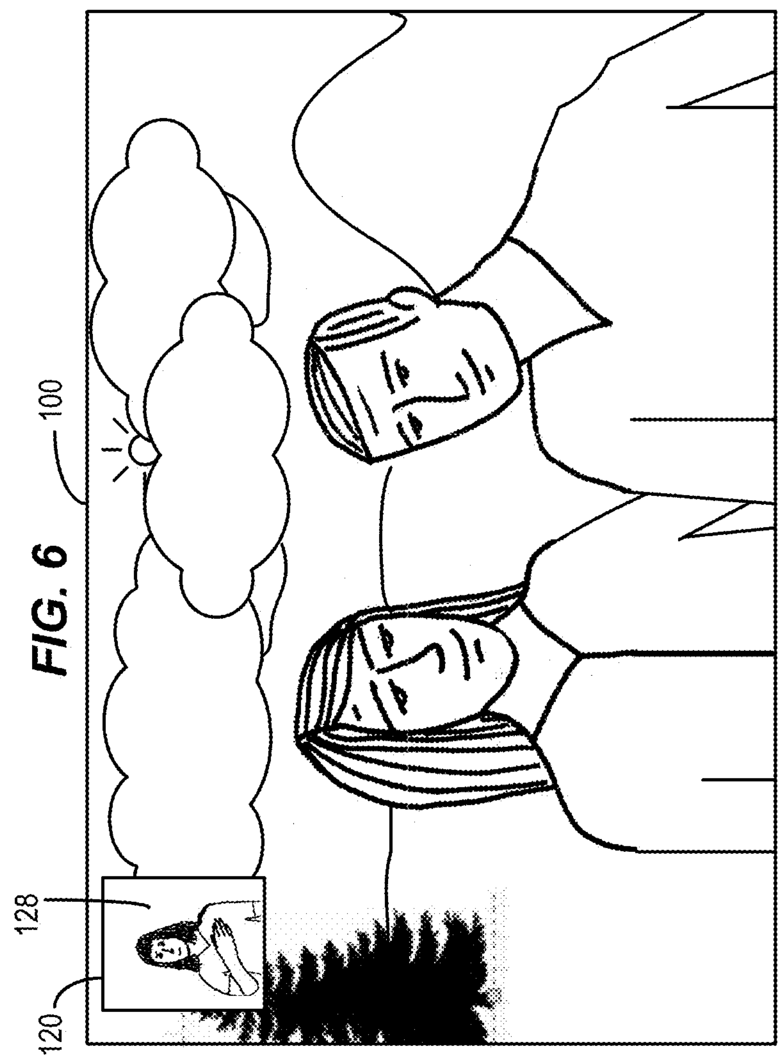
FIG. 6 is an illustration of a display having a sign language window near in the upper left corner of the displayed main image consistent with certain example embodiments of the present invention.

FIG. 6 depicts an example image as would appear if the user elected to place the closed caption video 128 at location #1—120.

Figure 7:
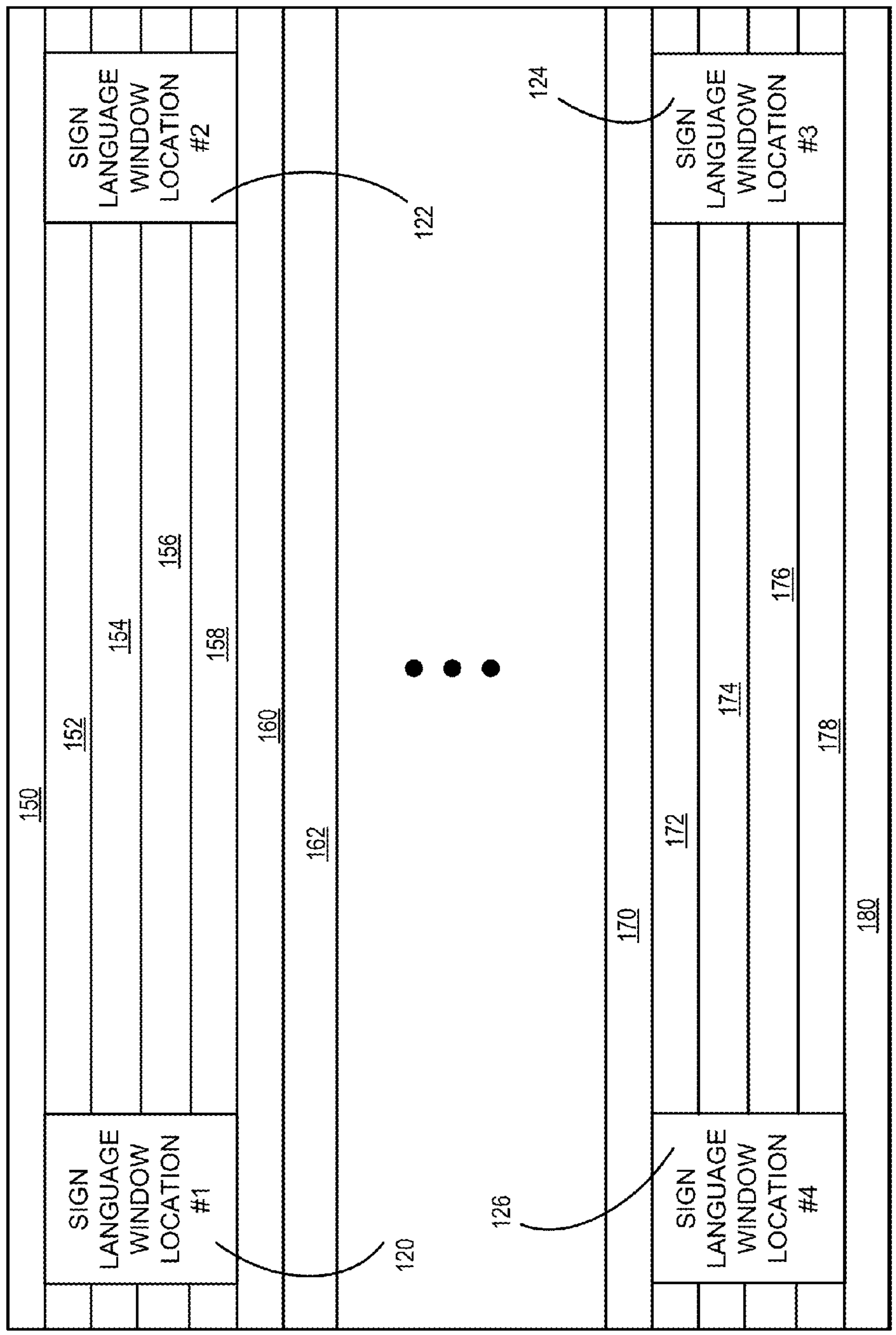
FIG. 7 illustrates by way of example, four locations for a sign language window and example video slices of macroblocks of the displayed image consistent with certain example embodiments of the present invention.

Referring now to FIG. 7, a simplified example video frame is illustrated showing the location of the four illustrative locations of the sign language window sub-frame at locations 120, 122, 124 and 126. Also depicted is a simplified plurality of video slices such as slices 150, 152, 154, 156, 158, 160, 162, 170, 172, 174, 176, 178 and 180 (more slices than shown is desirable for better resolution of the sign language). The digital video image is arranged in slices of video with each slice being made up of macro-blocks, with the macro-blocks being made up of I, B and P-macroblocks that are generally received in data packets (inter-coded, Bi-directional intra-coded and predictive intra-coded packets).

In one example embodiment, in order to facilitate replacement of main program content with a sign language content of window 128, the main program content is processed to reserve one or more sign language window locations in a manner that provides for ease of insertion of the sign language video. The encoding alters the main content at the sign language window location so that the main content is a free-standing 'block' of content that does not rely upon intra-coded packets outside the bounds of the sign language window location spatially. Moreover, the boundaries of the main content surrounding and outside the sign language window location are encoded so as not to rely upon the content within the bounds of the sign language window location spatially. That is, the bounding packets immediately outside and adjacent (left and fight) the SLW boundaries may be encoded, for example, as inter-coded packets, with intra-coded packets that depend upon the content within the SLW boundaries not being permitted.

Figure 8:
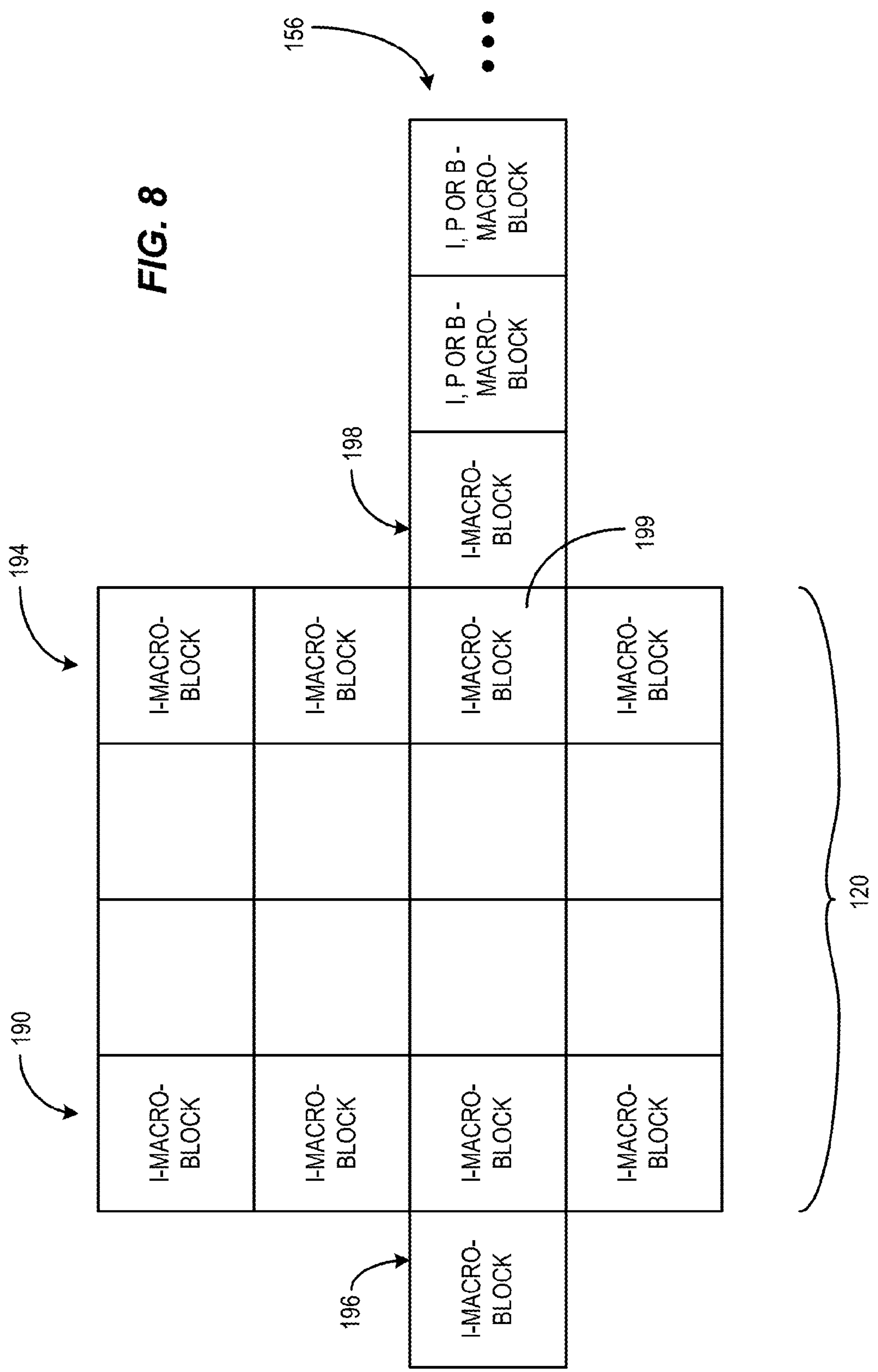
FIG. 8 is an example of a sign language window with illustrative macroblocks and video slices consistent with certain example embodiments of the present invention.

Consider by way of example, the processing of sign language window location #1—120 as depicted in simplified form in the more detailed illustration of FIG. 8, showing a simplified illustration of the encoding of the main content. In this illustration, the size of sign language window location #1—120 is shown to have fewer macroblocks than likely would be used for ease of illustration. The principle is illustrated by isolation of a single slice 156 along with the depiction of the window location 120. For purposes of this document, regions such as location #1—120 may be referred to as an "inter-coded location". The term "I-encoded location" or "inter-coded location" or the like is used herein to mean a sub-frame in a video frame that is encoded such that each slice of the region starts and ends with an I-macroblock or is otherwise encoded so as to render the region self-contained and not dependent upon data residing outside the region either spatially or temporally.

In order to achieve this, the initial macro-blocks in the location 120 starting at the left side of the location 120 may all be I-macro-blocks. This is shown along column 190. Similarly, each of the macro-blocks at the right edge of the location 120 may be I-macroblocks as shown along column 194. The macroblocks between 190 and 194 may also be I-macroblocks, or may be intra-coded macroblocks so long as there is no temporal or spatial dependency upon macroblocks outside the SLW. This renders the location 120 a fully self-contained location of video simplifying the substitution of sign language video content.

To assure that the remainder of the main video image is unaffected by this encoding and by any substitution action that occurs, it is also the case that each of the macro-blocks immediately preceding the start of location 120 at the left should be I-macro-blocks such as macro-block 196, and the first macroblock after the location 120 at the right should also be an I-macro-block such as 198. In this manner, each slice of video that crosses an SLW is processed so as to assure that the video data to the left and right of the SLW are encoded in a manner that does not depend upon intra-coding using content within the SLW. Similarly, the sign language content that may replace the main content data in the SLW is encoded so as to be free-standing and independent of any intra-coding using data outside the SLW.

The example presented provides for simple decision making with regard to the encoding of the SLW by simply calling for re-encoding of the main content data to create free-standing blocks of data within the SLW. Further, the encoding is carried out in a manner that assures that blocks of data bounding the SLW to the left and right are also free-standing and independent upon intra-coding using data within the SLW. This re-encoding of the main content will generally use slightly more data than the original content since the re-encoding reduces the possibilities for data compression using predictive encoding at the boundaries (inside and out) of the SLW. It is further noted, for completeness, that if an SLW is situated at the beginning or end of a video slice (i.e., the SLW is at a left or right edge of the displayed image), the encoding is adjusted accordingly. That is, if an SLW begins at the leftmost edge of the video image, there is no macroblock preceding the SLW at the left, and hence there is no main content to the left of the SLW to be re-encoded. It follows that the re-encoding is more efficient and able to utilize more intra-coding if the SLW's are located at the left and right edge of the displayed image.

It is noted that, in certain implementations, further compression of the video data may be preserved by continuing to use intra-coding at certain of the boundaries, providing however, that there are no intra-coded macroblocks at the boundary that depend on macroblocks outside the boundary. For example, if macroblock 199 depends only on preceding data within the location 120, and not on macroblock 198, it can remain as is without re-encoding to convert the macroblock to an inter-coded macroblock. The data between columns 190 and 194 may be encoded as all I-macroblocks or as I, B and P macroblocks, but should not have any temporal or spatial data dependencies that could potentially use data that are not a part of the sign language video data.

The sign language content is used to replace the main content within the SLW when sign language is enabled for a particular SLW. Hence, the sign language content is also encoded so as to assure that it is independent of macroblocks preceding and following the left and right boundaries of the sign language content that is inserted within the sign language window.

Figure 9:
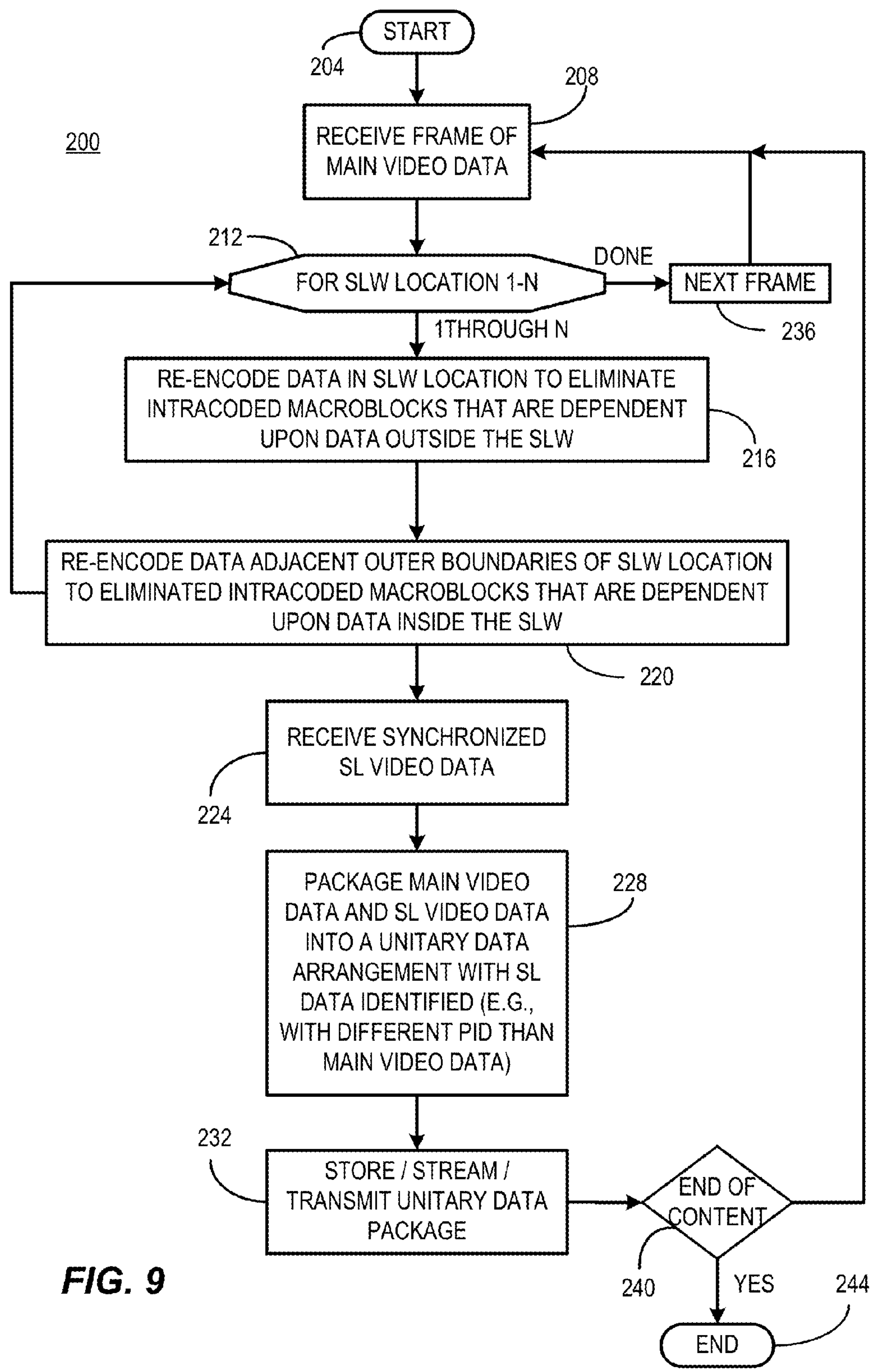
FIG. 9 is a flow chart of an example process 200 of a method of processing main program content to incorporate sign language window location and sign language content in a manner consistent with certain example embodiments of the present invention.

FIG. 9 depicts one example process 200 for carrying out the encoding as discussed above along with packaging the video content for storage or distribution. The process starts at 204 after which the main content is received frame by frame (or as a stream that is processed as a stream) at 208. Assuming a frame of video is available for this example, at 212 for each of N sign language window locations, the data in the SLW locations are re-encoded to eliminate the intra-coded macroblocks that are dependent upon data outside the SLW at 216. At 220, the data adjacent and outside the left and right boundaries of the SLW location are re-encoded to eliminate any intra-coded macroblocks that are dependent upon data inside the SLW.

At 224, synchronized sign language video (e.g. synchronized by using common time stamping in the sign language video and the main program content video) used for replacing the SLW is received. At 228, the sign language video and the re-encoded main content video are packaged into a unitary data arrangement with the sign language data identified in a manner that distinguishes it from the main content data, e.g., by use of its own designated packet identifier (PID). This data can then be stored, streamed, transmitted, etc. as a unitary data package at 232.

At 212, each of N SLW locations is processed in this manner as depicted by the looping between 212 and 216 until each of the SLWs are processed for the current frame. At this point, processing of the current frame is complete and the next frame is received or retrieved at 236 and the process repeats for each frame of the video in which a sign language window may be used. It is noted that when long portions of video are not accompanied by audio, it is possible that the SLW can be disabled during such pauses so as to minimize obstruction of the main content display.

When each of the frames is processed at 240, the end of the content is reached and the process ends at 244. If the end of the content has not been reached at 240, control returns to 208 to retrieve or receive the next frame of main content video. Other variations will occur to those skilled in the art upon consideration of the present teachings.

Figure 10:
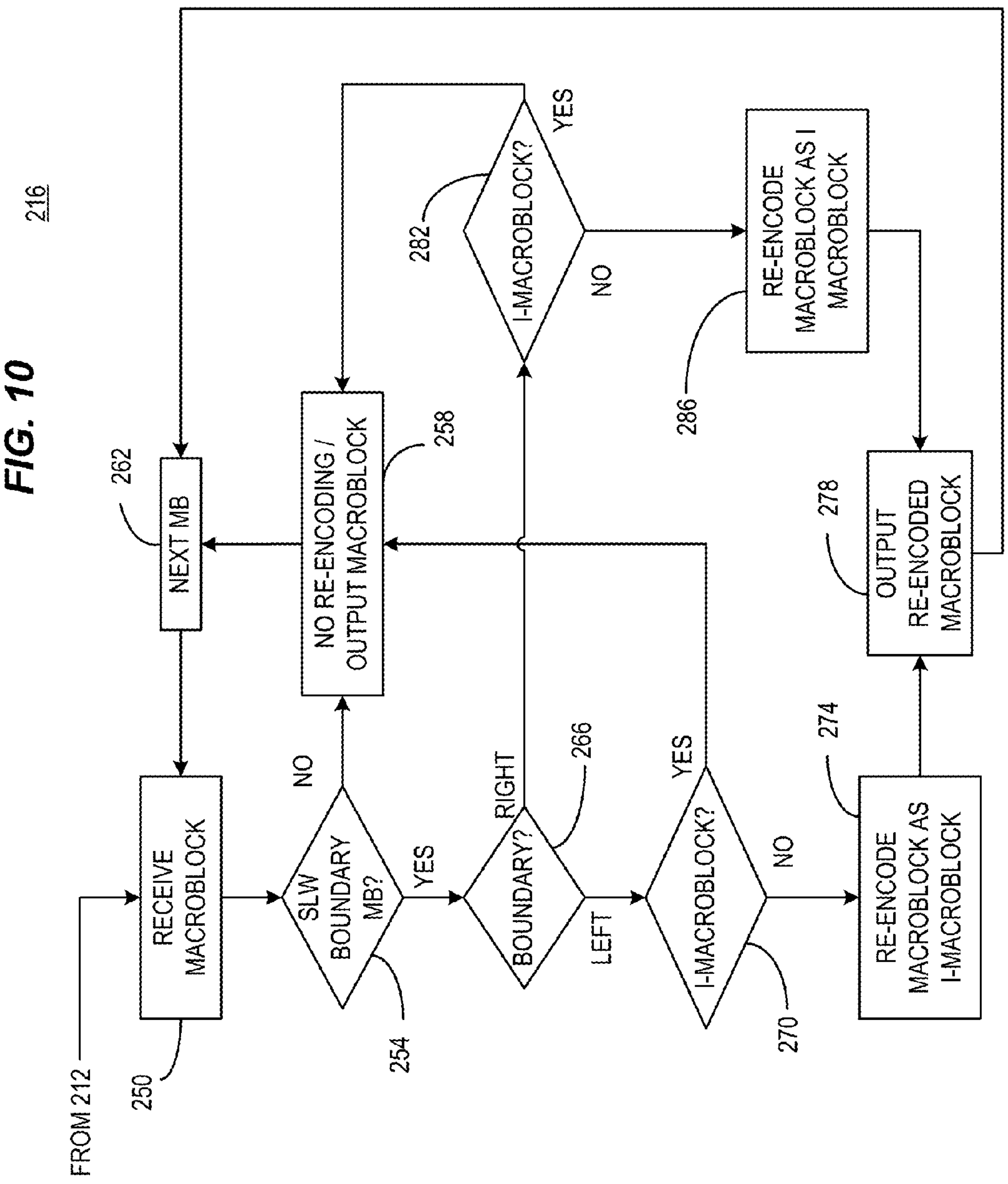
FIG. 10 is a flow chart depicting an example process of re-encoding main channel content within a sign language window in a manner consistent with certain embodiments of the present invention.

FIG. 10 depicts an example process 216 as used to re-encode the main content data as described above. This example presumes that the SLW is not necessarily at the left or right edge of the video display and deals with each case individually. In this example, the video frame is received from 212 and manipulated on a macroblock by macroblock basis starting at 250 where a macroblock is received. At 254, the process determines if the macroblock is at a left or right boundary of the SLW (and within the SLW). If not, no re-encoding is carried out at 258 and the original macroblock is output. The process proceeds to the next macroblock at 262 which is received at 250. If the macroblock is a boundary macroblock within the SLW at 254, then control passes to 266. At 266 the process determines whether the boundary he is a right boundary or a left boundary. If it is a left boundary the process proceeds to 270.

At 270 if the macroblock is an I-macroblock then again no encoding is carried out at 258, the original macroblock is output, and the process proceeds to the next macro block at 262. However, if the macroblock is not an I-macroblock at 270 the process to re-encodes the macroblock has an I-macroblock at 274 and the re-encoded macro block is output at 278. The process then proceeds to the next macroblock at 262.

At 266, if the boundary is a right boundary, control passes to 282 to determining if the macro block is an I-macro block or not. If the macroblock is an I-macroblock at 282, no re-encoding is done at 258 and the process proceeds to 262. If the macroblock is not an I-macroblock at 282, the macroblock can be re-encoded as an I-macroblock at 286 and the macroblock is output at 278. Control then passes to the next macroblock at 262.

Figure 11:
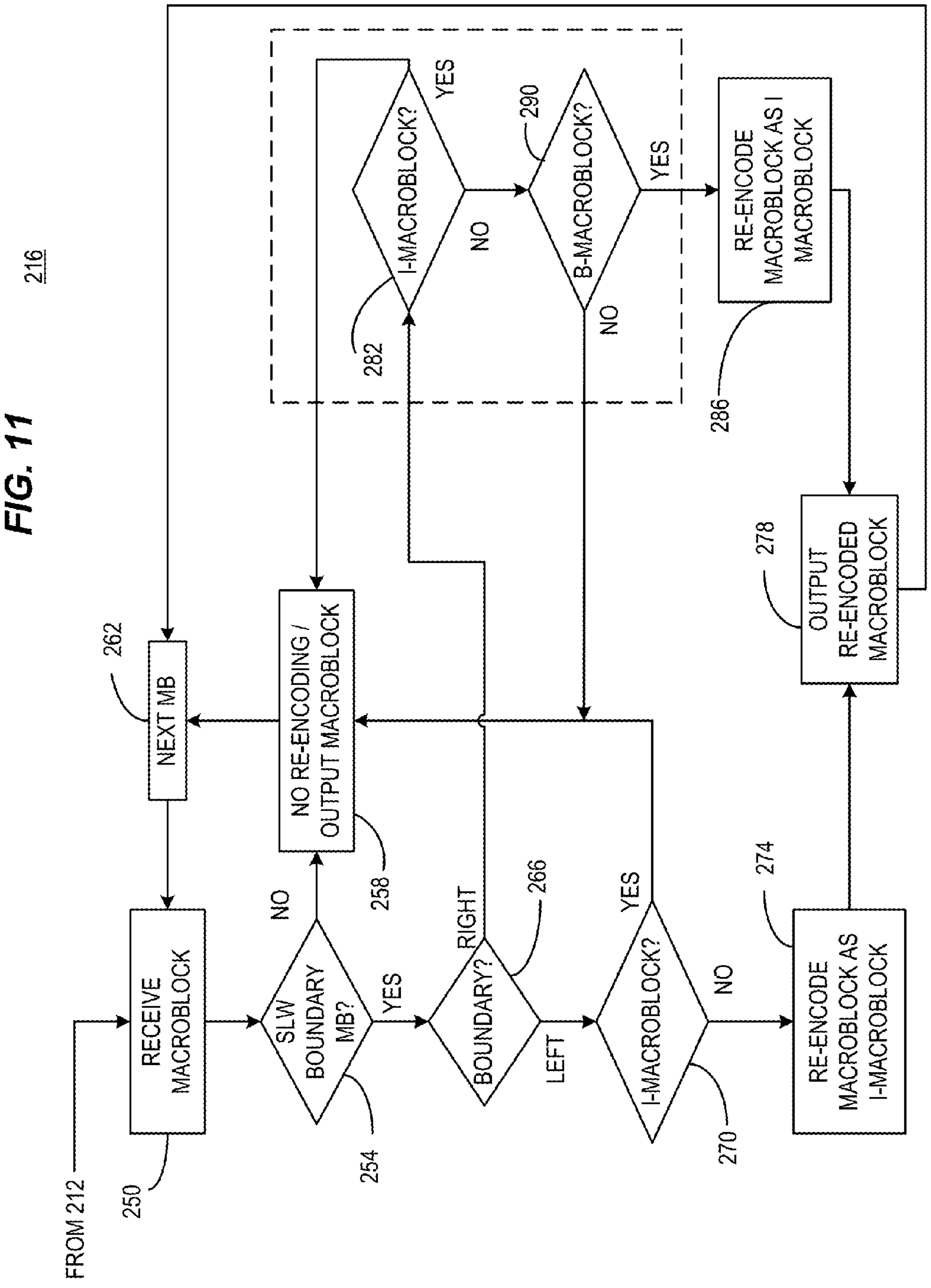
FIG. 11 is a flow chart depicting an example process of re-encoding main program content within a sign language window in a manner consistent with certain embodiments of the present invention.

In accord with the above example process, the macroblocks at the right edge of the SLW are encoded as I-macroblocks to simplify the processing. In a variation of this process as depicted in FIG. 11, the process 216 is modified to permit predictive coded macroblocks (P-macroblocks) to reside at the right boundary of the ALW. In this example, the same process is carried out as discussed above, except at 282 if the macroblock is not an I-macroblock, it may be further examined at 290 to determine if it is a bi-directional intra-coded macroblock (B-macroblock). If not, it can be concluded that the macroblock is a P-macroblock and can be used without re-encoding. It will be appreciated that the decisions 282 and 290 as shown in broken lines serve to determine if the macroblock can be used or if it should be re-encoded and uses a process of elimination to determine if the macroblock is an I or P macroblock. It will be clear that in the alternative, it can equivalently be determined whether if the macroblock is a B-macroblock and re-encode only B-macroblocks while passing I- and P-macroblocks without re-encoding. Other variations will occur to those skilled in the art upon consideration of the present teachings.

Figure 12:
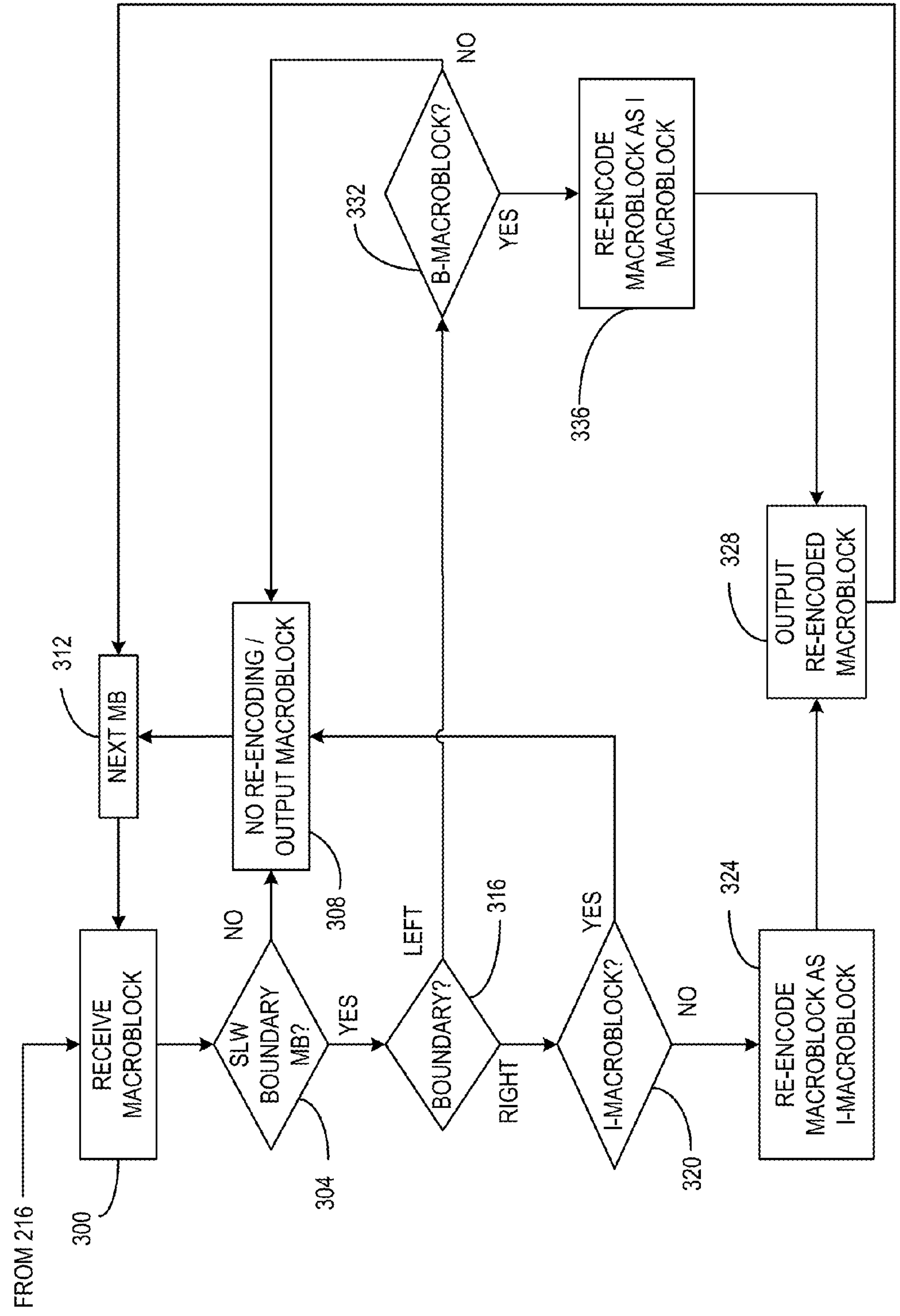
FIG. 12 is a flow chart depicting an example process of re-encoding main-channel content outside a sign language window in a manner consistent with certain example embodiments of the present invention.

Similar mechanisms may be used to re-encode the main content macroblocks that reside adjacent the ALW on the outside boundary thereof. One example process of 220 is depicted in FIG. 12. In this example, macroblocks are received from 216 at 300. At 304, the process determines if the macroblock is at the SLW boundary (this time outside the boundary of the SLW). If not, no re-encoding is carried out at 308 and the next macroblock 312 is received at 300.

If the macroblock is at the outside boundary at 304, and is at the right boundary at 316, a determination is made at 320 whether it is an I-macroblock. If so, no re-encoding is carried out at 308 and the next macroblock 312 is received or retrieved at 300. If the macroblock is not an I-macroblock at 320, the macroblock is re-encoded as an I-macroblock at 324 and the re-encoded macroblock is output at 328. The next macroblock 312 is then retrieved at 300.

At 316, if the macroblock is to the left of the SLW boundary, in this example, the process proceeds to 332 where a determination is made as to whether or not the macroblock is a B-macroblock. If not, it can be concluded that the macroblock is either an I- or P-macroblock (by direct analysis rather than an elimination process as discussed above). Hence, a macroblock on the left side of the SLW boundary that is either an I- or P-macroblock need not be re-encoded and the process proceeds to 308. But, if the macroblock is a B-macroblock, it is re=encoded at 336 and the process proceeds to 328.

Hence, reviewing FIGS. 10-12, the following TABLE 1 shows possibilities that exist for re-encoding of the macroblocks:

TABLE 1

| LOCATION | I-macroblock | P-macroblock | B-macroblock |
|---|---|---|---|
| Right boundary inside SLW | No re-encoding | No re-encoding or re-encode to I-macroblock | Re-encode to I-macroblock |
| Left boundary inside SLW | No re-encoding | Re-encode to I-macroblock | Re-encode to I-macroblock |
| Right boundary outside SLW | No re-encoding | No re-encoding or re-encode to I-macroblock | Re-encode to I-macroblock |
| Left boundary outside SLW | No re-encoding | Re-encode to I-macroblock | Re-encode to I-macroblock |
| Inside SLW not at right or left boundary | No re-encoding | No re-encoding or re-encode to I-macroblock | No re-encoding or re-encode to I-macroblock |
| Outside SLW not at right or left boundary | No re-encoding | No re-encoding | No re-encoding |

Figure 13:
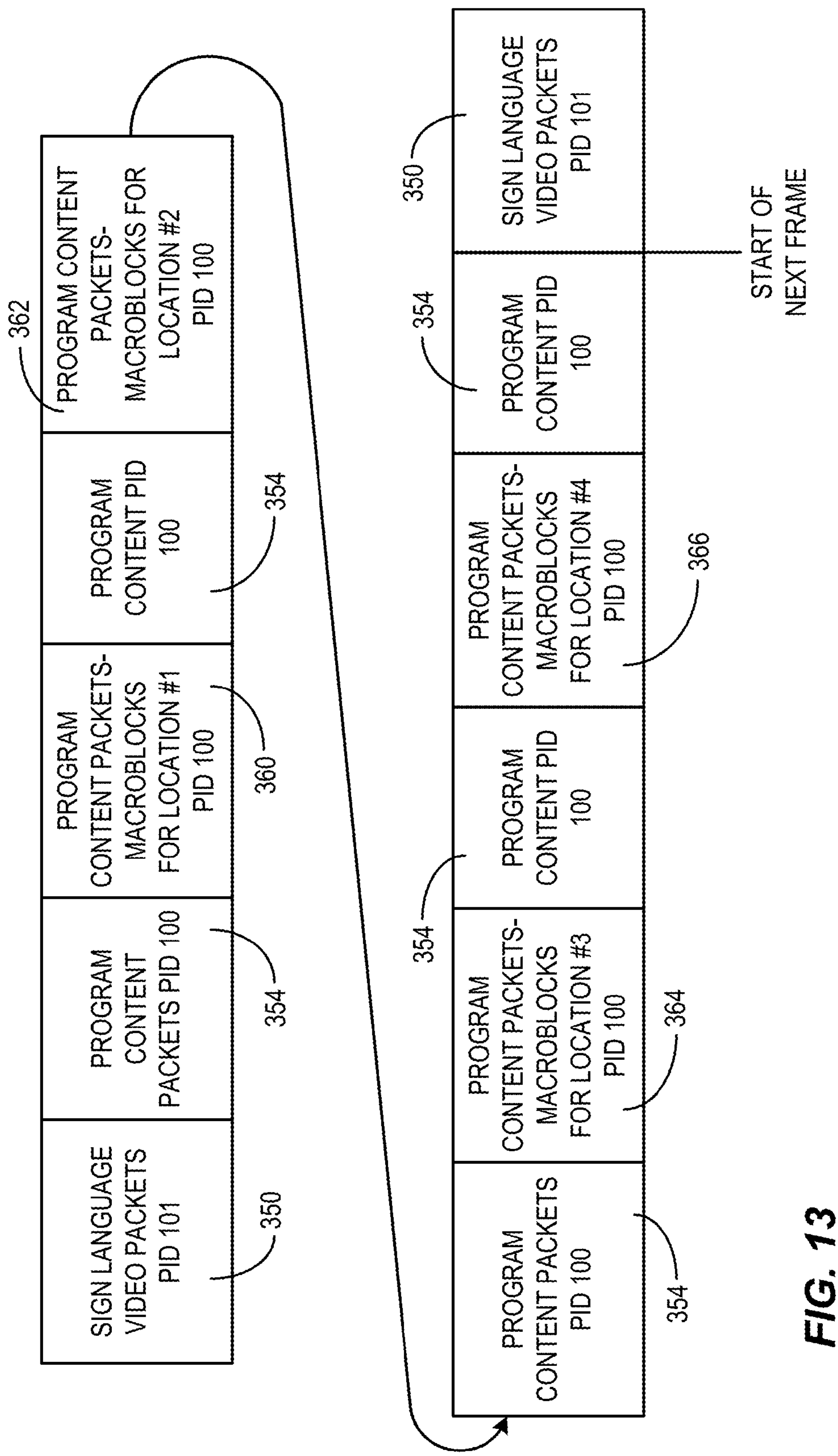
FIG. 13 is an example packaging of main program content with sign language content and re-encoded main program content at sign language window locations consistent with certain example embodiments of the present invention.

Referring back to FIG. 8, an example implementation of the packaging operation of 228 can be carried out as illustrated in FIG. 13. In this example, only the main program content video packets and the sign language video packets are depicted for ease of illustration. In this example embodiment, the four locations shown in FIG. 2 excluding location 127 are used for illustrative purposes. In this example, the sign language video packets are assigned a PID value of 101 as shown at 350. The sign language video packets may advantageously be transmitted (streamed, stored, etc.) in advance of the program content packets so that they can be conveniently buffered in a window buffer for the SLW with low storage capacity requirements. The sign language video packets are followed by program content packets having a different PID (e.g., 100 as illustrated here) at 354. Distributed throughout the remainder of the stream of video packets are multiple segments of main program content video packets with PID 100.

Also interspersed within the program content packets are program content packets for the SLW locations #1, #2, #3 and #4 designated 360, 362, 364 and 366. These freestanding portions of the video frame also carry main content Packet Identifiers (PID 100) and may be grouped together for each SLW location as shown, broken apart into multiple packets freely distributed in the data stream or located back to back without limitation. Keeping the SLW location packets together can, in some cases, simplify the substitution of the sign language video for the SLW packets. While the process is simplified by using the main content PID value for all parts of the main program content, a separate PID value may be assigned to the SLW locations if desired. After a frame is fully packaged, the next frame follows—in this implementation starting with the sign language video packets with PID 101 again.

Figure 14:
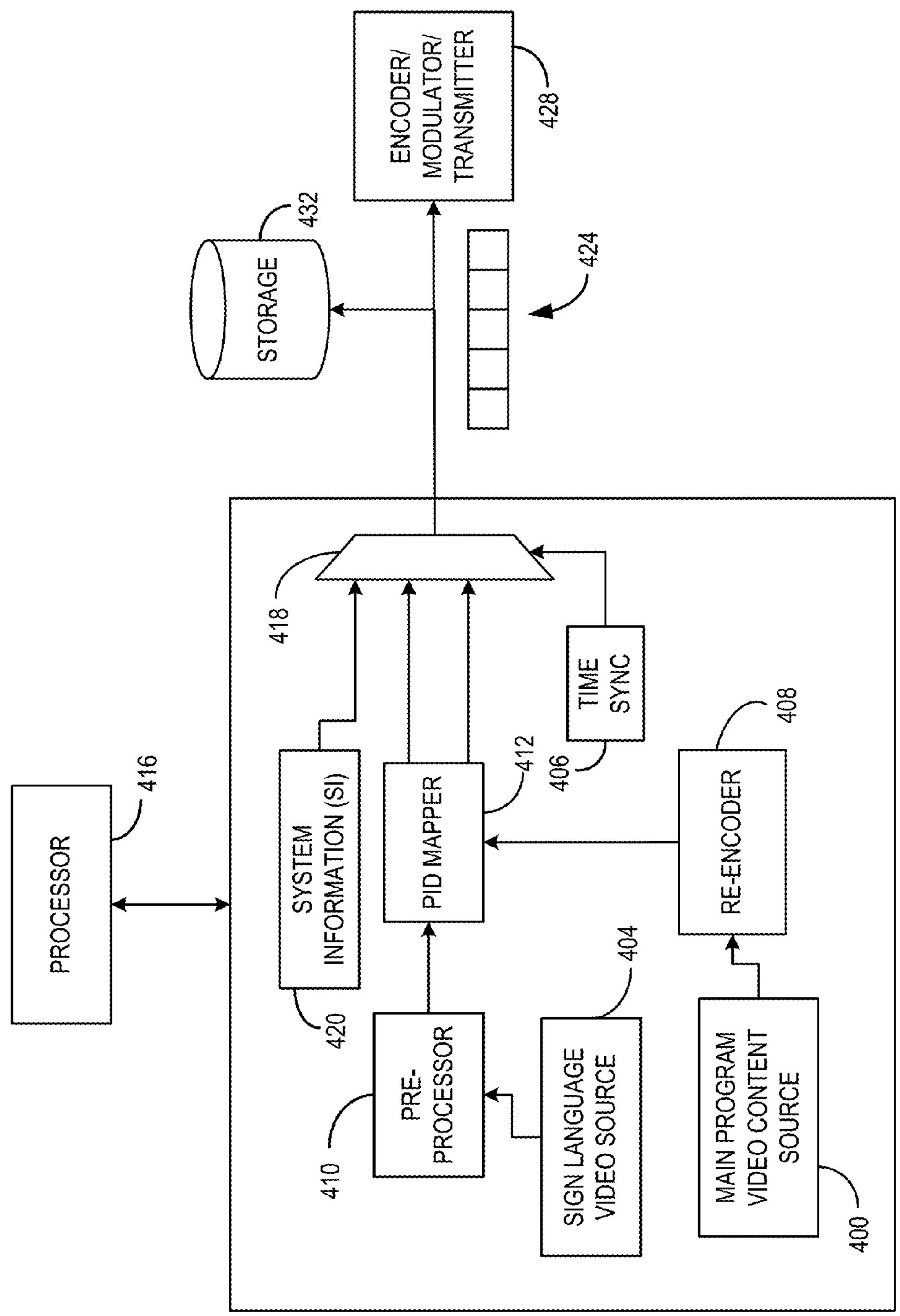
FIG. 14 is a block diagram of an illustrative example of an encoder device that encodes sign language content along with re-encoding main program content in a manner consistent with certain example embodiments of the present invention.

Referring now to FIG. 14, an example encoding system consistent with certain implementation is depicted in which a main program video content source 400 and a sign language video source 404 that is time synchronized (e.g., via use of common time codes generated at 406) with the main program content source 400 produce the video content that is to be processed. These video content sources 400 and 404 can be stored content or can be live content (i.e., from two different cameras) or the content 400 can be stored and the content 404 can be a live interpretation of the video content 400.

The sign language video source 404 may be pre-processed to be inter-coded and scaled so as to fit in an appropriate sized SLW replacing the main content therein. A sign language window may be, for example, approximately ⅛ to 1/10 the size of the main content image as displayed and can be scaled accordingly. If not pre-processed, then additional processing can be carried out at the encoder using pre-processor 410 which carries out scaling, cropping and re-encoding functions to produce an output of suitable size and resolution in the form of an inter-coded structure that does not depend upon data that has been removed and will not depend on data outside the bounds of the sign language window sub-frame.

The main program video content 400 is processed, for example in a manner as discussed above, to provide for sign language windows in defined location(s) using a re-encoder 408 (which in this example re-encodes on the basis of macroblocks, but that is not to be considered limiting since other embodiments may re-encode on a slice or packet basis). Macroblock re-encoder 408 can be a hard wired encoder that is configured to manipulate the main content to provide for freestanding sign language window locations in specified locations using the above teachings. Alternatively, the macroblock re-encoder may be configurable or programmable logic, or may be implemented using a programmed processor. As the main program video content is re-encoded at 408, the re-encoded content is passed to a PID mapper 412 that, under control of processor 416, assigns a suitable packet identifier to the re-encoded main program video content. PID mapper 412 also assigns a suitable PID to value to the sign language video content from 404. Both the main and sign language video content are provided by the PID mapper 412 to a multiplexer 418 which combines the main content with the sign language content as well as System Information (SI) 420 and time codes from 406 to produce, in this example, a stream such as that depicted in FIG. 13 which additionally may contain the SI information 420. This stream is depicted as an output stream 424 which can be further multiplexed with other content streams (not shown) to produce a multiplexed output stream for encoding/modulating/transmitting at 428 to recipients.

In another aspect, the multiplexed content 424 can be stored to a storage device 432 as a unified file which contains main content, sign language content and re-encoded sign language content. In various implementations, the content 424 may include or exclude SI information for storage. The processes carried out in block 436 are carried out under control of one or more processors 416 that may, for example, select the PID values so as to use unique values and to devise the system information that is multiplexed as well as other management functions.

Figure 15:
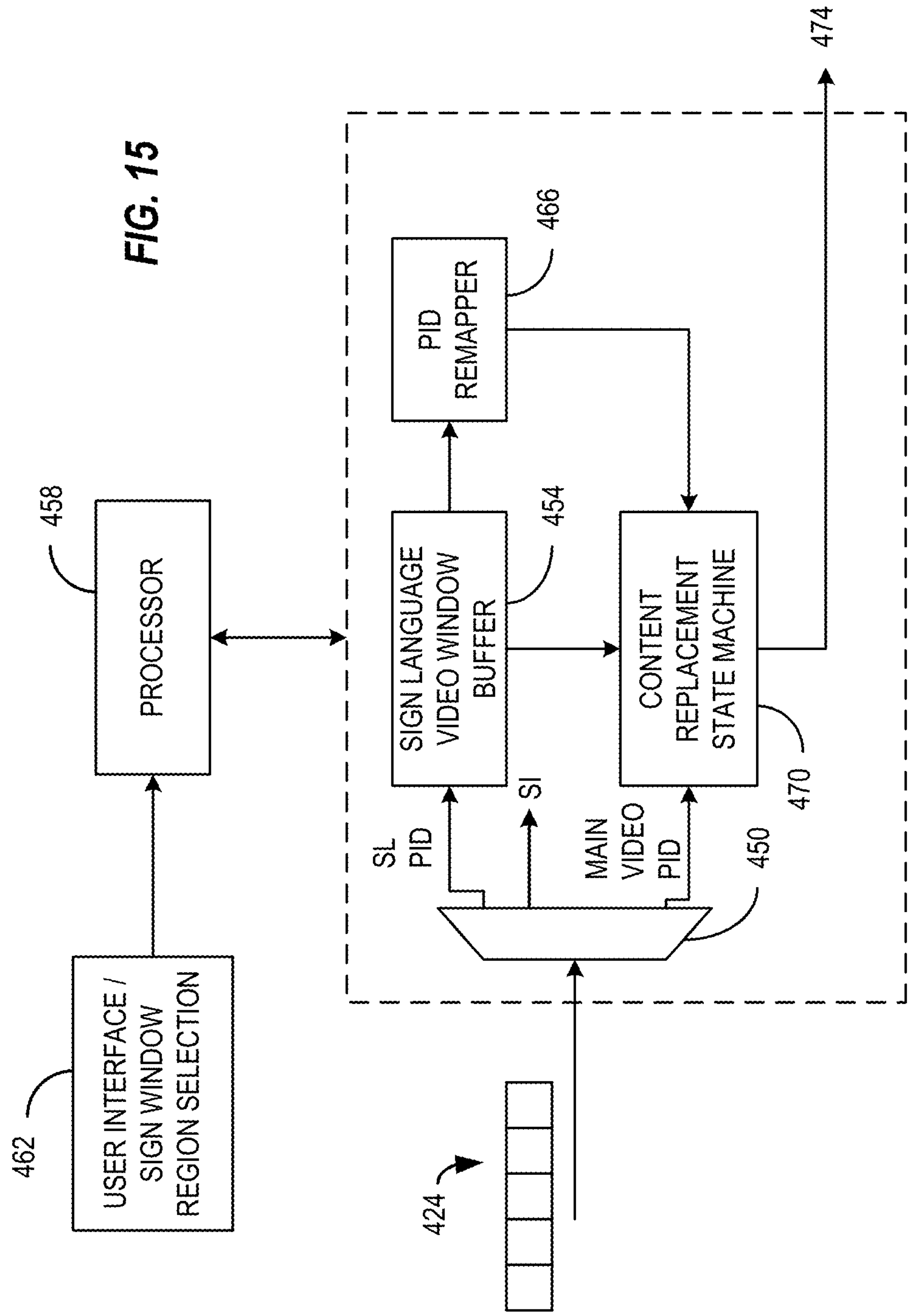
FIG. 15 is a block diagram of an illustrative example of a receiver device that decodes sign language content and main program content in a manner consistent with certain example embodiments of the present invention.

When the content is encoded and transmitted or streamed as described above, a receiver device such as the example device depicted in FIG. 15 can be used to decode the content and produce the desired video images with or without the sign language content and, when present, with the sign language window displayed in a user selected location. The stream of content (after demodulation, etc.) 424 is received by a demultiplexer device 450 which splits the incoming content into three streams. The first stream is the sign language content having the sign language assigned PID which is passed to a sign language window buffer 454 which is large enough to hold at least a single sub-frame of sign language video. The System Information (SI) is also demultiplexed by 450 to produce output used by processor 458 to control various system functions. The demultiplexing function is carried out at 450 by use of PID filtering to separate content associated with each PID value into a separate output stream.

Under control of the processor 458, which is responsive to user commands input by the user interface 462 and to the SI, a PID remapper 466 remaps the PID value of the sign language content in buffer 454 to the same PID as the main video content PID, in this example. Processor 458 maintains synchronization using the time codes of the main program content that are synchronized with the sign language content. The remapped sign language video can then be passed to a content replacement state machine 470. This state machine, under control of the processor 458, substitutes sign language content for the main program content based upon the PID values in a designated sign language location and produces an output 474 that has the designated SLW populated with the sign language video. The PID values may be deleted at this point unless further processing based on PID value is carried out. This output is then processed in a conventional manner for display as video on a video display. Other variations will occur to those skilled in the art upon consideration of the present teachings.

Referring now to FIG. 16, an example of a content substitution process 500 consistent with certain illustrative embodiments as carried out at a receiver device such as a television receiver or television set-top box is shown starting at 504. The content 424 is received at 506 having portions identified by multiple PIDs (e.g., PID 100 and PID 101 in this example), which represent multiple possibilities for the location of the sign language content. This content could be received as a stream of content (as in a cable, satellite or Internet Protocol television) or could be present in packaged media or a downloaded file. In any case, at 508 if a sign language location is selected, a processing operation (such as playback or reception of the content) is initiated, generally using the main program content designated with a particular packet identifier.

At 510, the process waits for the next I-Frame of main content video before starting the substitution process. This allows the data substitution to begin with a frame that is freestanding and simplifies the isolation of the SLW from intra-coding problems. The sign language content is filtered from the data stream and placed in a buffer at 512. The buffer can be small in size so as to hold the most recently received frame of sign language data. At 516, data processing for a video frame is initiated. When the designated sign language substitution location is reached at 520, sign language content with initial PID 101 is substituted for the SLW location (having PID 100) at 524 until the end of a slice of the SLW location is reached (or alternatively, until the end of the SLW is reached, depending upon how the process is configured).

When the end of the main content is reached at 528, the process ends at 532. Until the process ends, control passes from 528 to 536 for incrementing to the next frame, window or slice to carry out the content substitution for each frame.

In this example, if no sign language location is selected, at 510, the main program content can be processed without substitution of the sign language content at 540 and the process ends at 544. In other implementations, a default location can be used or the last selected location can be used for example and as discussed previously, the selection of a location as well as whether or not to display the sign language window can be determined by the user.

Figure 17:
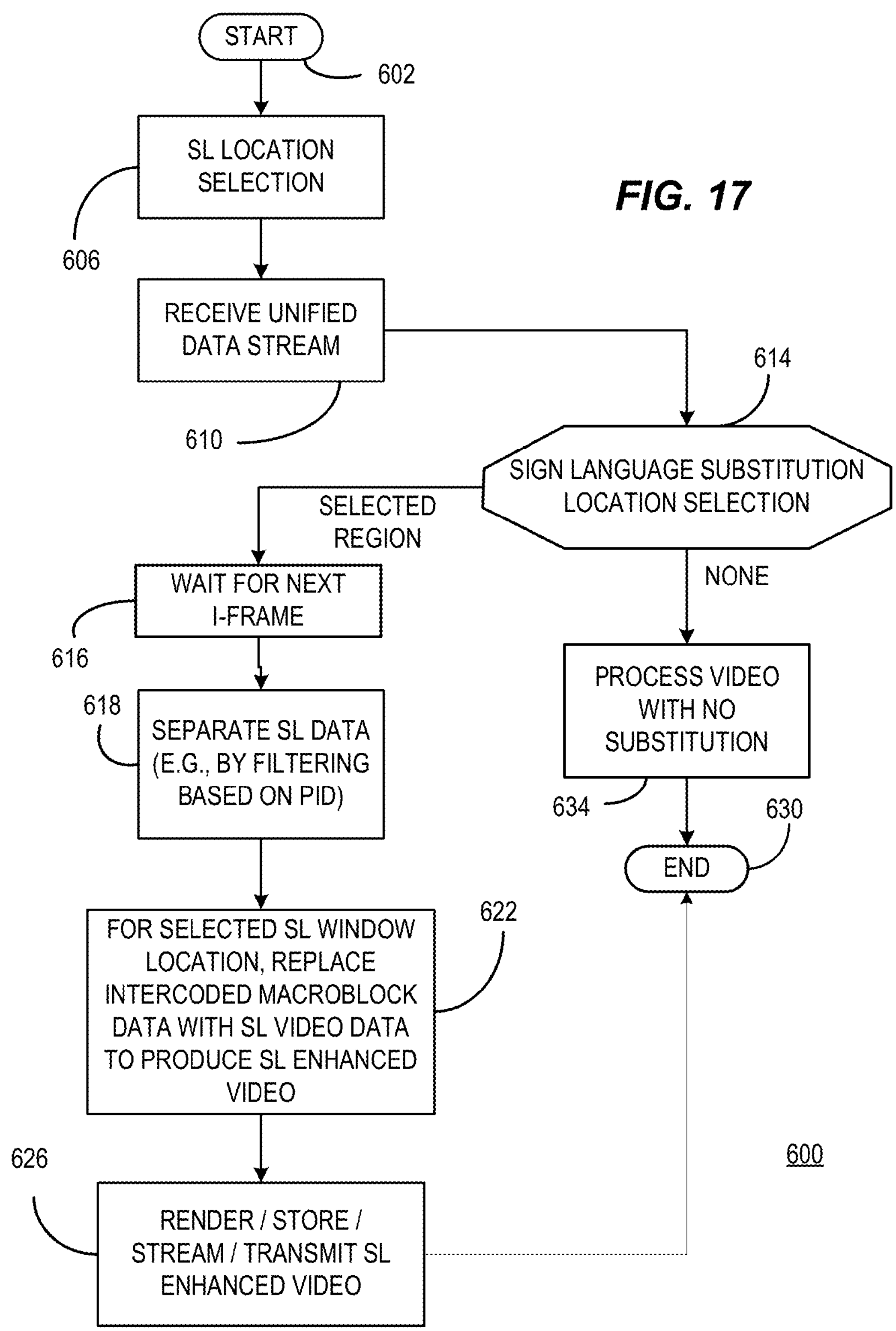
FIG. 17 is a flow chart of an example process of sign language content substitution consistent with certain example embodiments of the present invention.

FIG. 17 depicts a higher level abstraction of an example sign language substitution process 600 as discussed is presented. In this process 600, starting at 602 after which a sign language window location is selected (or a selection is retrieved) at 606. The data stream is received or retrieved and if a region is selected at 614, at the next I-frame at 616, the sign language data are separated from the main program content by PID filtering (for example) at 618 and stored (otherwise, the SL data can be discarded). At 622, for the selected sign language window location, the interceded location content is replaced by the interceded sign language substitute video data to produce the SL enhanced video. This video can then be rendered to a display, stored, transmitted, etc. and the process ends at 630. If no location is set at 614, the video can be processed without content substitution at 634 and the process ends at 630. Other variations will occur to those skilled in the art upon consideration of the present teachings.

Thus, an apparatus for selectively supplementing main program video content with a sign language translation has a video receiver device configured to receive data representing audio and a frame of video content, the data having a plurality of packet identifiers (PIDs) where a first PID is associated with main program video content, and where a second PID is associated with sign language video content that provides a translation of the audio content into a sign language. The main program video content has frames of video content in which a plurality of locations are processed to accept substitution of the sign language video content. A user interface forms a part of the video receiver device and is configured to produce a signal indicative of a user selection of a selected location of the plurality of locations for display of the sign language video content. A content replacement circuit forms a part of the video receiver device. Responsive to the signal indicative of the user selection, the content replacement circuit is configured to substitute the content of the selected location with the sign language content to produce a video frame having a sub-frame containing the sign language video content at the selected location.

In certain example implementations, the plurality of locations is inter-coded so as to rely only on information present within each of the plurality of locations. In certain example implementations, the sign language video content is inter-coded so as to rely only on sign language video data present within the sign language video content. In certain example implementations, the user interface is further configured to produce a disable signal indicative of a user selection to display no sign language content; and responsive to the disable signal, the content replacement circuit is configured to make no substitution of the inter-coded content at any of the plurality of locations with the inter-coded sign language content. In certain example implementations, the content replacement circuit comprises a hardware content replacement state machine. In certain example implementations, a buffer is sized to store a single unit of the sign language video content, where the single unit comprises one of a packet of sign language video content, a sub-frame of sign language video content and a slice of sign language video content. In certain example implementations, the received data is ordered so that the sign language video content is received in advance of the data that encodes main program content video at the plurality of locations that are processed to accept substitution of the sign language video content. In certain example implementations, the sign language video content has a lower frame rate than the main program A/V content. In certain example implementations, the apparatus forms a part of a television Set-top box. In certain example implementations, the main program content and the sign language content comprises one of streamed data, a data file and a packaged medium containing a data file.

Another example apparatus for selectively supplementing main program video content with a sign language translation has a video receiver device configured to receive data representing audio and a frame of video content, the data having a plurality of packet identifiers (PIDs) where a first PID is associated with main program video content, and where a second PID is associated with sign language video content that provides a translation of the audio content into a sign language. In certain example implementations, the main program video content has frames of video content in which a plurality of locations are processed to accept substitution of the sign language video content. The plurality of locations is inter-coded so as to rely only on information present within each of the plurality of locations. The sign language video content is inter-coded so as to rely only on sign language video data present within the sign language video content. A user interface forms a part of the video receiver device, and is configured to produce a signal indicative of a user selection of a selected location of the plurality of locations for display of the sign language video content. A content replacement circuit forms a part of the video receiver device. Responsive to the signal indicative of the user selection, the content replacement circuit is configured to substitute the inter-coded content of the selected location with the inter-coded sign language content to produce a video frame having a sub-frame containing the sign language video content at the selected location.

In certain example implementations, the user interface is further configured to produce a disable signal indicative of a user selection to display no sign language content; and responsive to the disable signal, the content replacement circuit is configured to make no substitution of the inter-coded content at any of the plurality of locations with the inter-coded sign language content. In certain example implementations, the content replacement circuit comprises a hardware content replacement state machine. In certain example implementations, a buffer is sized to store a single unit of the sign language video content, where the single unit comprises one of a packet of sign language video content, a sub-frame of sign language video content and a slice of sign language video content. In certain example implementations, the received data is ordered so that the sign language video content is received in advance of the data that encodes main program content video at the plurality of locations that are processed to accept substitution of the sign language video content. In certain example implementations, the sign language video content has a lower refresh rate than the main program A/V content. In certain example implementations, the apparatus forms a part of a television Set-top box.

A method of selectively supplementing main program video content with a sign language translation consistent with certain example implementations involves: at a video receiver device, receiving data representing audio and a frame of video content, the data having a plurality of packet identifiers (PIDs) where a first PID is associated with main program video content, and where a second PID is associated with sign language video content that provides a translation of the audio content into a sign language; where the main program video content comprises frames of video content in which a plurality of locations are processed to accept substitution of the sign language video content; at the video receiver device, receiving a signal indicative of a user selection of a selected location of the plurality of locations for display of the sign language video content; and responsive to receiving the signal indicative of the user selection of the selected location, at a content replacement circuit within the video receiver device, substituting the content of the selected location with the sign language content to produce a video frame having a sub-frame containing the sign language video content at the selected location.

In certain example implementations, the plurality of locations are inter-coded so as to rely only on information present within each of the plurality of locations In certain example implementations, the sign language video content is inter-coded so as to rely only on sign language video data present within the sign language video content. In certain example implementations, the video receiver device receives a signal indicative of a user selection to display no sign language content, and responsive thereto makes no substitution of the inter-coded content at any of the plurality of locations with the inter-coded sign language content. In certain example implementations, the content replacement circuit comprises a hardware content replacement state machine. In certain example implementations, a buffer is sized to store a single unit of the sign language video content, where the single unit comprises one of a packet of sign language video content, a sub-frame of sign language video content and a slice of sign language video content. In certain example implementations, the received data is ordered so that the sign language video content is received in advance of the data that encodes main program content video at the plurality of locations that are processed to accept substitution of the sign language video content. In certain example implementations, the sign language video content has a lower frame rate than the main program A/V content. In certain example implementations, the process is carried out in a television Set-top box.

A video encoder for encoding digital video with location selectable sign language image has a source of main program audio/video (A/V) content and a source of sign language video content corresponding to audio of the main program A/V content. A packet identifier (PID) mapper is configured to map a first PID to the video portion of the main program A/V content and maps a second PID to the sign language video content. A re-encoder is configured to re-encode the main program A/V content to establish a plurality of pre-defined display locations designated as locations for a sign language window. A multiplexer is configured to receive and multiplex the re-encoded main program A/V content and the sign language video content to produce a unified data structure containing the re-encoded main program A/V content and the sign language video content.

In certain example implementations, the plurality of locations is inter-coded by the re-encoder so as to rely only on information present within each of the plurality of locations. In certain example implementations, the sign language video content is inter-coded so as to rely only on sign language video data present within the sign language video content. In certain example implementations, the multiplexer multiplexes the data so that the sign language video content is situated in advance of the data that encodes main program content video at the plurality of locations that are processed to accept substitution of the sign language video content. In certain example implementations, the multiplexer further multiplexes system information with the sign language content and the main program A/V content. In certain example implementations, a time synchronizer provides time codes to the sign language video content data and to the main program A/V content data, where the same time codes are used for both the sign language video content data and the main program A/V video content data. In certain example implementations, the sign language video content has a lower frame rate than the main program A/V content. In certain example implementations, the main program content and the sign language content are encoded as one of streamed data, a data file or a packaged medium containing a data file.

Figure 18:
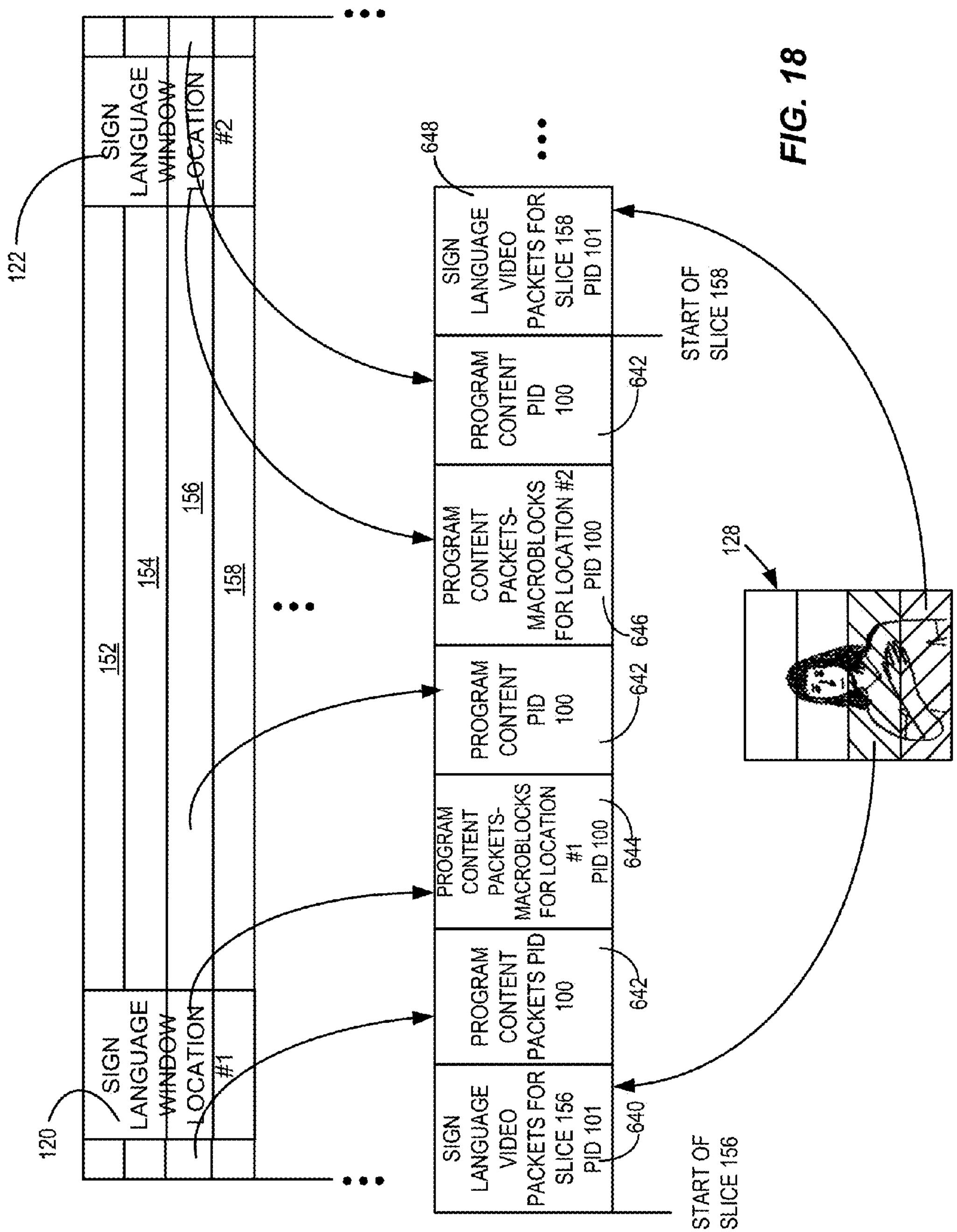
FIG. 18 is an illustration depicting a data arrangement consistent with certain example embodiments of the present invention.

Many variations in these processes are possible. As discussed above, the encoding can be carried out on a frame-by-frame basis in which the data arrangement shown in FIG. 13 represents the data for a full frame of video. In this case, the buffering is for a full frame of video. In another implementation, the encoding can be carried out on a video slice-by-video slice basis as depicted in FIG. 18. Consider the slice 156 and 158 by way of example. The sign language data 128 for slice 156 is encoded at 640 as it would appear in either SLW 120 or SLW 122 in slice 156 and is situated at 640. This data can be buffered in a buffer that is at least as large as the sign language data in a single slice; hence, the buffer size can be very small. Data at 642 represents the main program content for slice 156. The main program content for slice 156 as illustrated includes data to the left and right of the SLW location 120 (#1) and to the right of SLW location 122 (#2). The main program content packets for the SLW location 120 is encoded at 644 for slice 156 and for SLW location 122 is encoded as 646 for slice 156.

When all content is encoded as shown for slice 156, encoding of slice 158 ensues starting with the sign language video packets for slice 158 at 648. This procedure is repeated for all slices of the video image. When no SLW is encountered in a slice, the video image is encoded normally without the sign language video packets and without the encoded SLW video encoding. It is noted that as soon as a slice of the sign language video is encoded once, it is buffered and can be used for any SLW location that is encountered along the same slice. If a larger buffer is used, one which stores the entire SLW video frame, the encoding of the sign language video can be stored and used for any SLW encountered for any subsequent slice as the picture is processed from upper left to lower right (e.g., SLW location #3 or #4 of FIG. 7—not shown in this illustration). To keep the buffer size low, the sign language video data may be encoded slice-by-slice for each slice encountered having a possible SLW location as the picture is processed from upper left to lower right.

Figure 19:
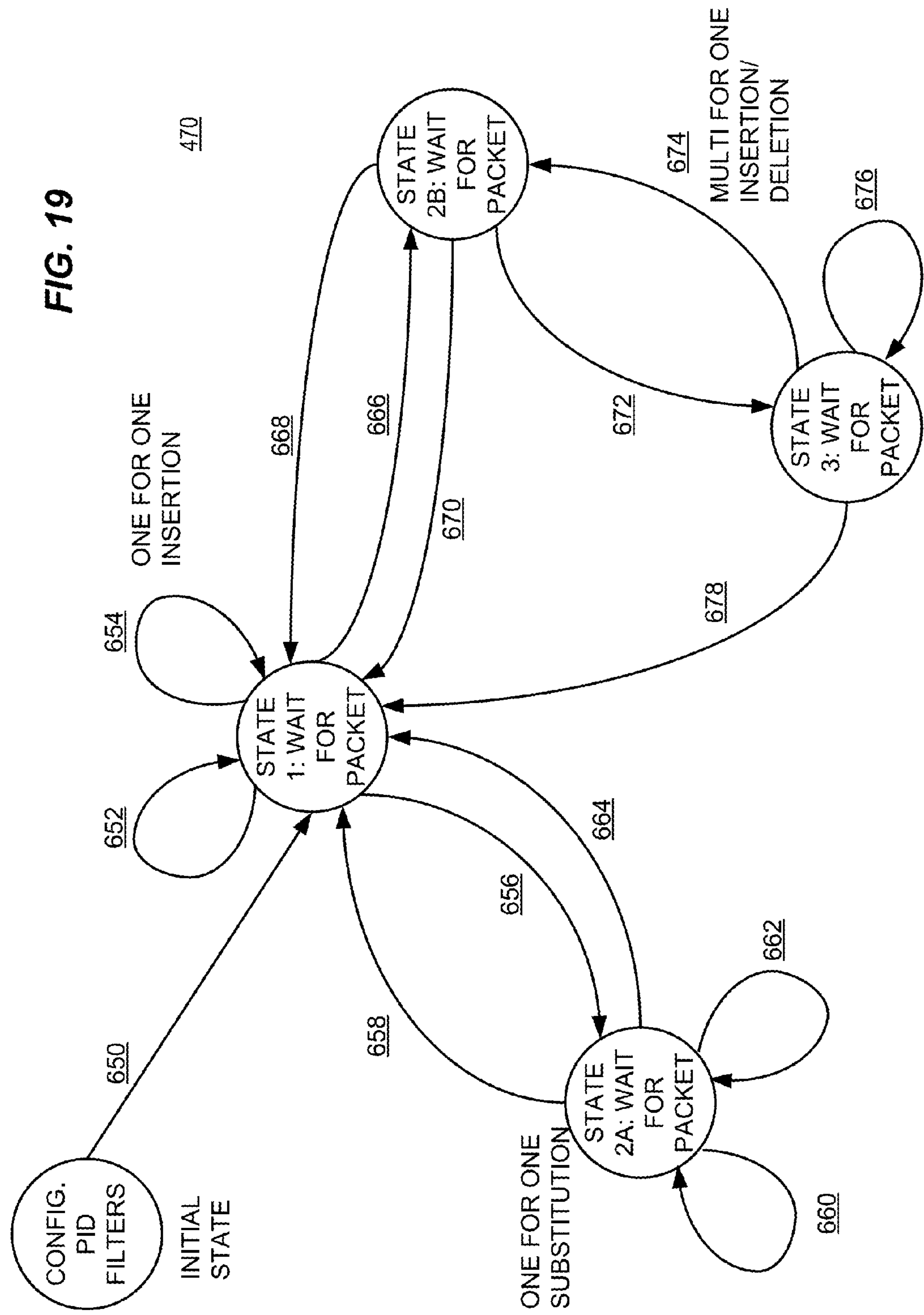
FIG. 19 is an example state diagram for an example state machine consistent with certain example embodiments of the present invention.

Turning now to FIG. 19, a state diagram for an illustrative content replacement state machine 470 is shown which depicts one mechanism for implementing a decoder that decodes a transport stream with multiple PIDs consistent with certain embodiments of the present invention. Devices implementing such hardware state machines were designed to support multiple selective encryption as described in the above referenced patent applications are available commercially for example as the Broadcom BCM 7500 and BCM7400 families of integrated circuits such as 7583, 7584, 7400, 7404, 7418, 7421, 7422, 7429 as well as others manufactured by other manufacturers. Such circuits have are designed to process Sony Corporation's Passage® selective encryption packet handling operations and include a hardware based state machine that can be programmed to soft transport processing for use in conjunction with the present teachings. The numbered paths of the state diagram are explained in the TABLE 2 below where content with PID A is the main program content and content with PID B is the sign language content (also referred to as primary and secondary below):

TABLE 2

STATE TABLE

| PATH NUMBER | CONDITIONS |
|---|---|
| 650 | Transition from initialization state |
| 652 | PID=A :Queue Packet |
| 654 | (PID=B, Mode=2) :PID=A :Queue Packet |
| 656 | (PID=B, Mode=1) :PID=A :Queue Packet |
| 658 | PID=A :PID=NULL |
| 660 | (PID=B, Queue_on_Error) :Error_IRQn |
| 662 | (PID=B, Queue_on_Error) :PID=A :Queue Packet :Error_IRQn |
| 664 | Decode_RSTn + MPEG Transport Error |
| 666 | PID=B : PID=A : Queue Packet |
| 668 | (PID=B, Mode=4) :PID=A :Queue Packet |
| 670 | Decode_RSTn + MPEG Transport Error |
| 672 | PID=A :PID=NULL |
| 674 | PID=B :PID=A :Queue Packet |
| 676 | PID=A :PID=NULL |
| 678 | Decode_RSTn + MPEG Transport Error |

This state machine is described in the cross-referenced patent applications listed above which are incorporated by reference. For this discussion, a primary PID is a PID for the main program video content (PID A). A secondary PID is for the sign language video content (PID B).

The replacement of the primary PID packet by the secondary PID packet is called "Substitution Mode". Secondary PID packets may be inserted into the stream without replacement of a primary PID packet. This mode is called "Insertion Mode." In fact, the decoder may be used in a mode wherein both operations are active at the same time. This is called "Insertion and Deletion Mode". All three discrete decoder modes are mutually exclusive and follow a series of state transitions that are specific to each mode. The active mode is signaled through the decoder specific variable mode. If the value of mode is set to zero, decoding is not enabled and the transport decoder state machine is bypassed. If the value of mode is invalid (not a specifically defined state, then the same actions are taken as if mode was set to zero, i.e. the transport decoder state machine is bypassed. The definition of the state transitions for each mode is detailed as followed.

The algorithm for decoding an encoded transport stream is embodied in the state machine of FIG. 19. The Petri net showing the states and the state equations/actions can be derived from FIG. 19 in combination with the above state table. The algorithm has four operating states; with the system predominantly remaining is state 1. State 2 is entered only when a packet containing a shadow PID (not the main PID) has been encountered. Depending upon the system mode, as established through messaging in the PSI from the headend, different paths to two entirely different second states can be taken.

The state machine can be implemented in either hardware or software, depending upon the IC manufacturer's device architecture. A software implementation on a programmed processor can generally be expected to provide more flexibility in the design.

One error case identified (illegal state transition). This error is a unique error that is in addition to MPEG transport layer errors like continuity count, transport error, etc. Error_IRQn is the detection of two adjacent shadow packets without an intervening legacy packet, with n representing the number of the specific decoder. Depending upon the setting of the decoder specific variable queue_on_error, two different operations can occur. If the variable is set to true, the decoder will process the second shadow packet (PID=B) as in the non-error case. If the variable is set to false, the second shadow packet is discarded.

Whenever packets are inserted or deleted, the continuity count (CC) of the primary stream (PID=A), will be preserved by adjusting the CC as appropriate. The decode_RSTn variable is a non-latching bit that can be set through a configuration register or accessed by other functions to force the decoder state machine n to a known state.

One mode of operation of the decoder transport processing algorithm is referred to as the Substitution Mode. In this mode packets having PID B are inserted into the transport stream by replacement of PID B with PID A to produce output packets for an MPEG compliant transport stream with the desired content packets containing a PID field matching A, where A is a 13 bit value previously defined in a configuration register of the decoder. A "no operation" is carried out for PID A packets. In the "home" state, state 1, A packets such as 508 become packets such as 510 are sent to the transport filter output queue for further processing, such as A/V decompression and display. In mode 1, the decoder state machine transitions from state 1 to state 2A upon reception of a MPEG packet with the PID field matching B, after receipt of a substitution flag. B is a 13 bit value previously defined in a configuration register of the decoder. B represents the secondary or "shadow" packet to be substituted for the next occurring packet with PID matching A. The PID value of the B packet is changed to A before insertion into the stream. The substitution occurs because upon transition to state 2A, the B packet content is sent to the transport filter output queue.

The return to state 1 occurs when the next A PID is received. In this case, it is not queued and is converted to the NULL (0x1fff) PID value, effectively erasing it from the stream without altering the overall stream timing as would have occurred if it were physically removed. The return to state 1 can also be signaled by receipt of another substitution flag indicating termination of the substitute mode.

Another mode of operation of the decoder transport processing algorithm is referred to as the Insertion Mode, for an MPEG compliant transport stream with the desired content packets containing a PID field matching A, where A is a 13 bit value previously defined in a configuration register of the decoder. In the "home" state, state 1, A packets are sent to the transport filter output queue for further processing, such as A/V decompression and display. In mode 2, the decoder state machine never transitions from state 1. Upon reception of a MPEG packet with the PID field matching B, where B is a 13 bit value previously defined in a configuration register of the decoder, B represents the secondary or "shadow" packet to be inserted into the stream with the PID value changed to A. In this mode, transition from state 1 to state 2B can occur due to receipt of an insertion flag. PID B packets are inserted into the transport stream as PID A packets. The insertion mode can terminate by receipt of the next insertion flag.

The decoder transport processing algorithm for the Insertion/Deletion Mode for a MPEG compliant transport stream with the desired content packets containing a PID field matching A, where A is a 13 bit value previously defined in a configuration register of the decoder. In the "home" state, state 1, A packets are sent to the transport filter output queue for further processing, such as A/V decompression and display and become packets. In mode 4, the decoder state machine transitions from state 1 to state 2B upon reception of a MPEG packet with the PID field matching B, where B is a 13 bit value previously defined in a configuration register of the decoder, B represents the secondary or "shadow" packet to be inserted with PID changed to match A. Any packet received while in state 2B with the PID value matching A will result in a transition to state 3 and the packet PID changed to NULL, effectively removing it from the transport stream. All subsequent packets received with PID matching A while in state 3 will result in their PID value also being changed to NULL. Transition to and from state 1 can be initiated and terminated by an insertion/deletion flag respectively. While in state 3, packets with PID B are converted to packets with PID A.

The return to state 2B occurs when the next packet with a B PID value is received and it is queued and converted to the A PID value. Likewise, return to the return to state 1 from state 2B occurs when the next packet with a B PID value is received accordingly, it is also queued and converted to the A PID value.

In methods consistent with the present invention, private signaling can be used to select a unit of sign language content on the secondary PID while receiving main program content on the primary PID. Alternatively, private signaling can be used to select multiple units of content with the secondary PID while discarding units of content with the primary PID. Similarly, private signaling can be used to select multiple units of content with a secondary PID while receiving units of content with the primary PID. Also, private signaling can be used to switch from a mode of selecting multiple units of content with the secondary PID while discarding units of content with the primary PID to a mode of selecting multiple units of content with the secondary PID while receiving content with the primary PID. Private signaling can also be used to switch from a mode of selecting multiple units of content with the secondary PID and receiving multiple units of content with the primary PID to a mode of selecting multiple units of content with the secondary PID while discarding units of content with the primary PID.

A unit of content with the secondary PID can be sent before a corresponding unit of content with the primary PID. Substitution operations can be initiated and terminated by private signaling forming part of an adaptation layer of packets in a data stream. The adaptation layer can be in a packet with the secondary PID, the primary PID or another PID. Other variations will occur to those skilled in the art upon consideration of the present teachings.

Figure 20:
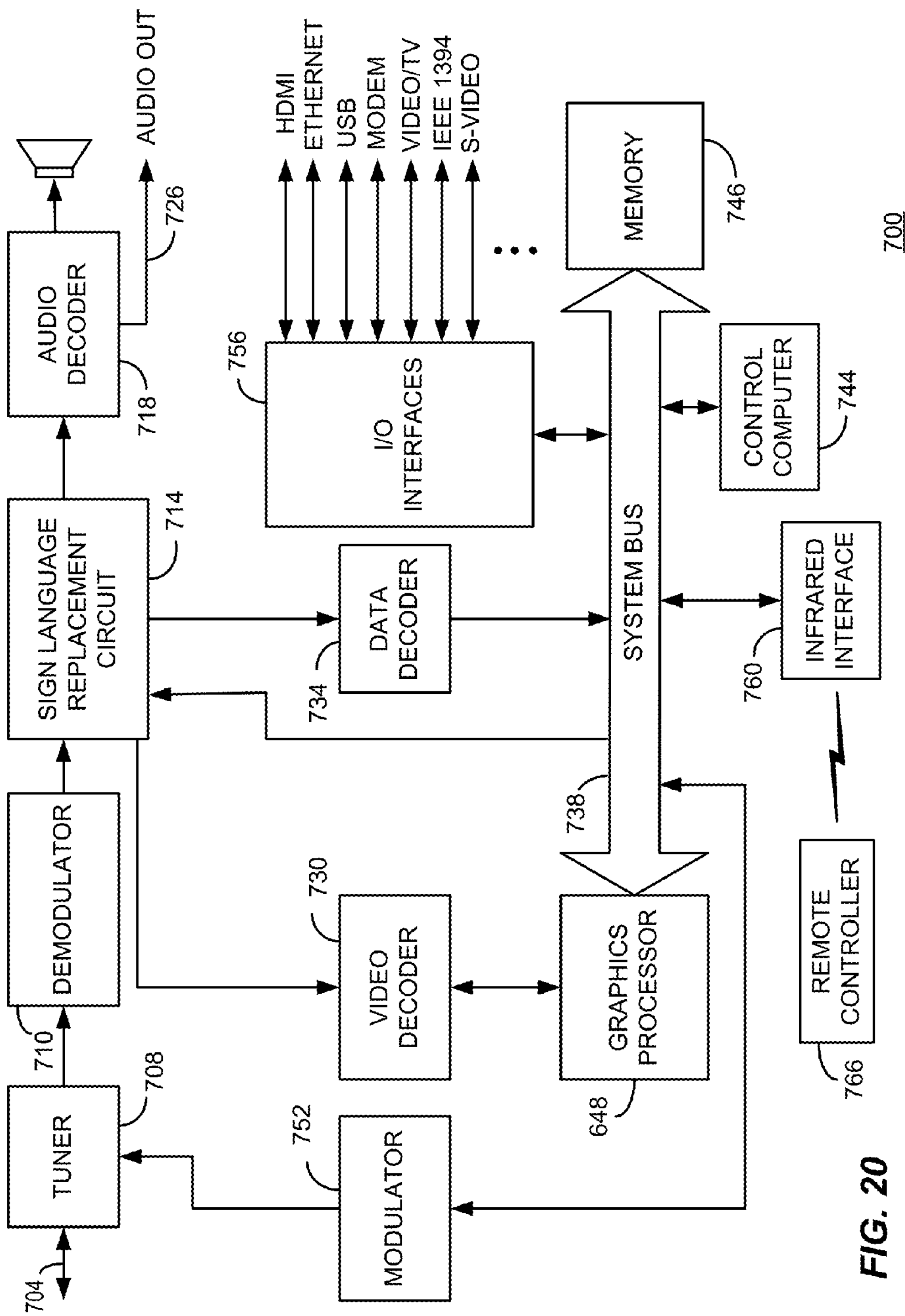
FIG. 20 is an example block diagram of a receiver device consistent with certain example embodiments of the present invention.

A decoder such as the above can be incorporated within a television STB, set back box, television set, IPTV receiver or other television receiver device and can be used to provide the end user with sign language capabilities. Referring now to FIG. 20, an exemplary system configuration for a digital television Set-top box 700 is illustrated. Many configurations for such a STB are possible and the STB illustrated should only be considered as exemplary of such a STB configuration. In this exemplary set-top box, the transmission medium 704, such as a coaxial cable, is coupled by a suitable interface to a tuner 708. Tuner 708 may, for example, include a broadcast in-band tuner for receiving video content. Modulated information formatted, for example, as MPEG-2 information is then demodulated at a demodulator 710. The demodulated information at the output of demodulator 710 is provided to a sign language replacement circuit 714 where the information is separated into discrete channels of programming.

The programming is divided into packets, each packet having a PID that identifies the packet as containing a particular type of data (e.g., audio, video, data, sign language data) relating to a particular program. A decrypter (not shown) decrypts encrypted information in accordance with a decryption algorithm to prevent unauthorized access to programming content, for example. The sign language replacement circuit 714 can operates in a manner similar to that of the decoder described by the state diagram of FIG. 19 under program control to carry out the replacement process as described above and below.

Audio packets from 714 (those identified with an audio PID) are decrypted and forwarded to an audio decoder 718 where they may be converted to analog audio to drive a speaker system (e.g., stereo or home theater multiple channel audio systems) or other audio system 722 (e.g., stereo or home theater multiple channel amplifier and speaker systems) or may simply provide decoded audio out at 726. Video packets from 714 (those identified with a video PID) are decrypted and forwarded to a video decoder 730. In a similar manner, data packets from the demultiplexer 714 (those identified with a data PID) are decrypted and forwarded to a data decoder 734.

Decoded data packets from data decoder 734 are sent to the set-top box's computer system via the system bus 734. A control computer 744 can thus access the decoded data from data decoder 734 via the system bus 738 as well as programs and data in memory 746. Video data decoded by video decoder 730 is passed to a graphics processor 748, which is a computer optimized to processes graphics information rapidly. Graphics processor 748 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 748 may be unnecessary in some set-top box designs having lower capabilities, and the function of the graphics processor 748 may be handled by the control computer 744 in some applications where the decoded video is passed directly from 714 to a video encoder. Graphics processor 748 is also coupled to the system bus 738 and operates under the control of control computer 744.

STB 700 can operate in a bidirectional communication mode so that data and other information can be transmitted not only from the system's head end to the end user, or from a service provider to the end user of the STB 700, but also, from the end user upstream using an out-of-band channel. In one embodiment, such data passes through the system bus 738 to a modulator 752 through a diplexer forming part of tuner 704 and out through the transmission medium 704. This capability is used to provide a mechanism for the STB 700 and/or its user to send information to the head end (e.g., service requests or changes, registration information, etc.) as well as to provide fast outbound communication with the Internet or other services provided at the head end to the end user.

Set-top box 700 may include any of a plurality of I/O (Input/Output) interfaces represented by I/O interfaces 756 that permit interconnection of I/O devices to the set-top box 600. By way of example, and not limitation, a universal serial bus (USB) port can be provided to enable interconnection to any suitable serial device supported by the STB 700's internal software. Similarly, communication with appropriately compatible devices can be provided via an Ethernet port, port, an IEEE 1394 (so-called firewire™ or i-link™) or IEEE 1394 wide port, or S-video port, HDMI port, etc. An infrared interface 760 provides communication with a remote controller 766. Such interfaces can be utilized to interconnect the STB 700 with any of a variety of accessory devices such as storage devices, audio/visual devices, gaming devices (not shown), Internet Appliances, etc.

I/O interfaces 756 can also include a modem (be it dial-up, cable, DSL or other technology modem) having a modem port to facilitate high speed or alternative access to the Internet or other data communication functions. In one embodiment, the modem port is that of a DOCSIS (Data Over Cable System Interface Specification) cable modem to facilitate high speed network access over a cable system, and port is appropriately coupled to the transmission medium 604 embodied as a coaxial cable. Thus, the STB 700 can carry out bidirectional communication via the DOCSIS cable modem with the STB 700 being identified by a unique IP address. The DOCSIS specification is publicly available.

A PS/2, Bluetooth or other keyboard/mouse/joystick interface can be provided to permit ease of data entry to the STB 700. Such inputs provide the user with the ability to easily enter data and/or navigate using pointing devices. Pointing devices such as a mouse or joystick may be used in gaming applications.

Of course, STB 700 also may incorporate basic video outputs that can be used for direct connection to a television set instead of (or in addition to) an IEEE 1394 connection. In one embodiment, the video output can provide composite video formatted as NTSC (National Television System Committee) video. In some embodiments, the video output can be provided by a direct connection to the graphics processor 748 or the sign language replacement circuit 714 rather than passing through the system bus 738 as illustrated in the exemplary block diagram.

The infrared interface 760 receives commands from an infrared remote control 766, infrared keyboard or other infrared control device. Although not explicitly shown, front panel controls may be used in some embodiments to directly control the operation of the STB 700 through a front panel control interface as one of the provided interfaces. Selected interfaces such as those described above and others can be provided in STB 700 in various combinations as required or desired.

Figure 21:
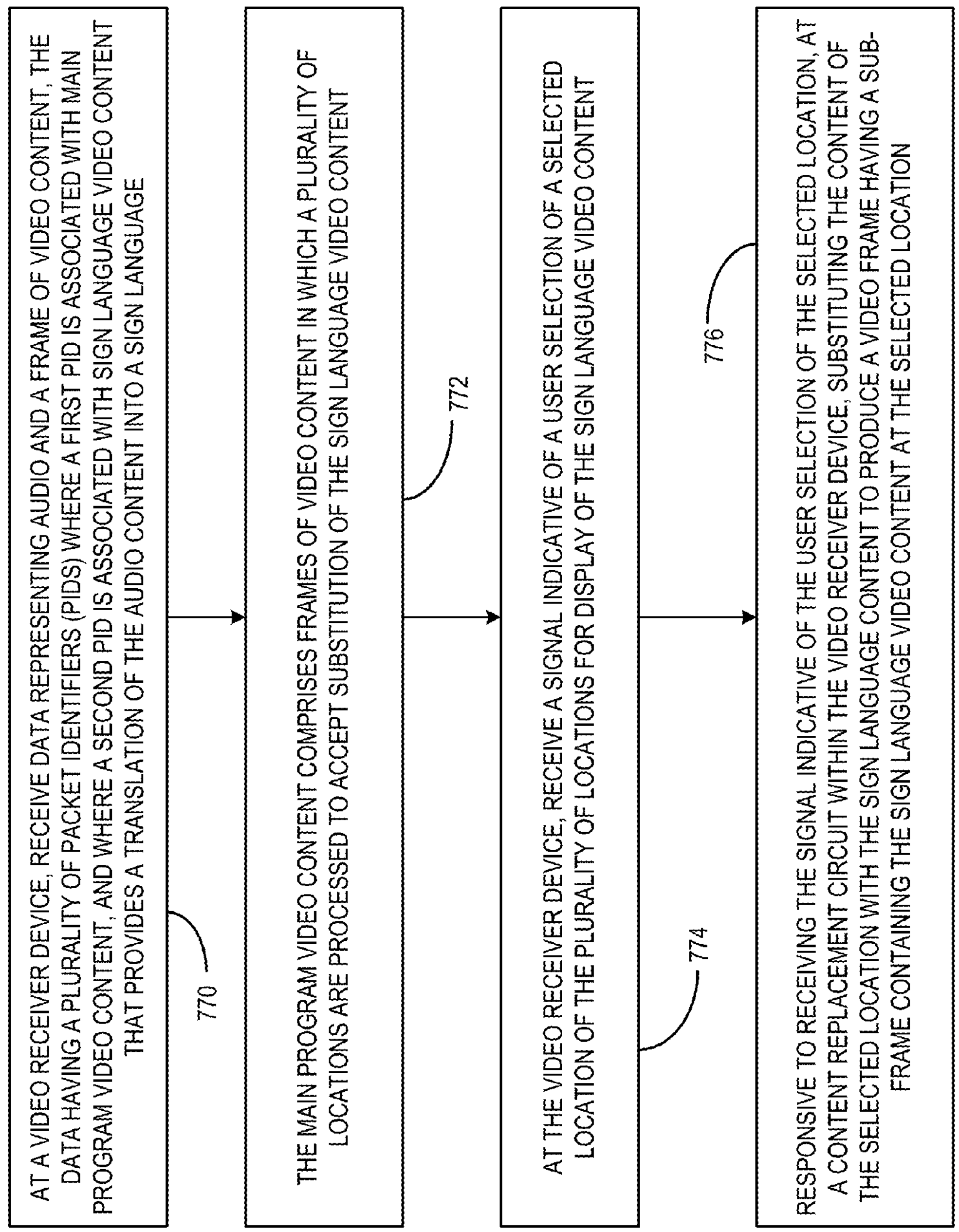
FIG. 21 is a flow chart depicting an example decoding process consistent with certain example embodiments of the present invention.

Thus, with reference to FIG. 21, a method of selectively supplementing main program video content with a sign language translation involves, at 770 a video receiver device, receiving data representing audio and a frame of video content, the data having a plurality of packet identifiers (PIDs) where a first PID is associated with main program video content, and where a second PID is associated with sign language video content that provides a translation of the audio content into a sign language. At 772, the main program video content has frames of video content in which a plurality of locations are processed to accept substitution of the sign language video content. At 774, the video receiver device, receiving a signal indicative of a user selection of a selected location of the plurality of locations for display of the sign language video content. At 776, responsive to receiving the signal indicative of the user selection of the selected location, at a content replacement circuit within the video receiver device, substituting the inter-coded content of the selected location with the inter-coded sign language content to produce a video frame having a sub-frame containing the sign language video content at the selected location.

Figure 22:
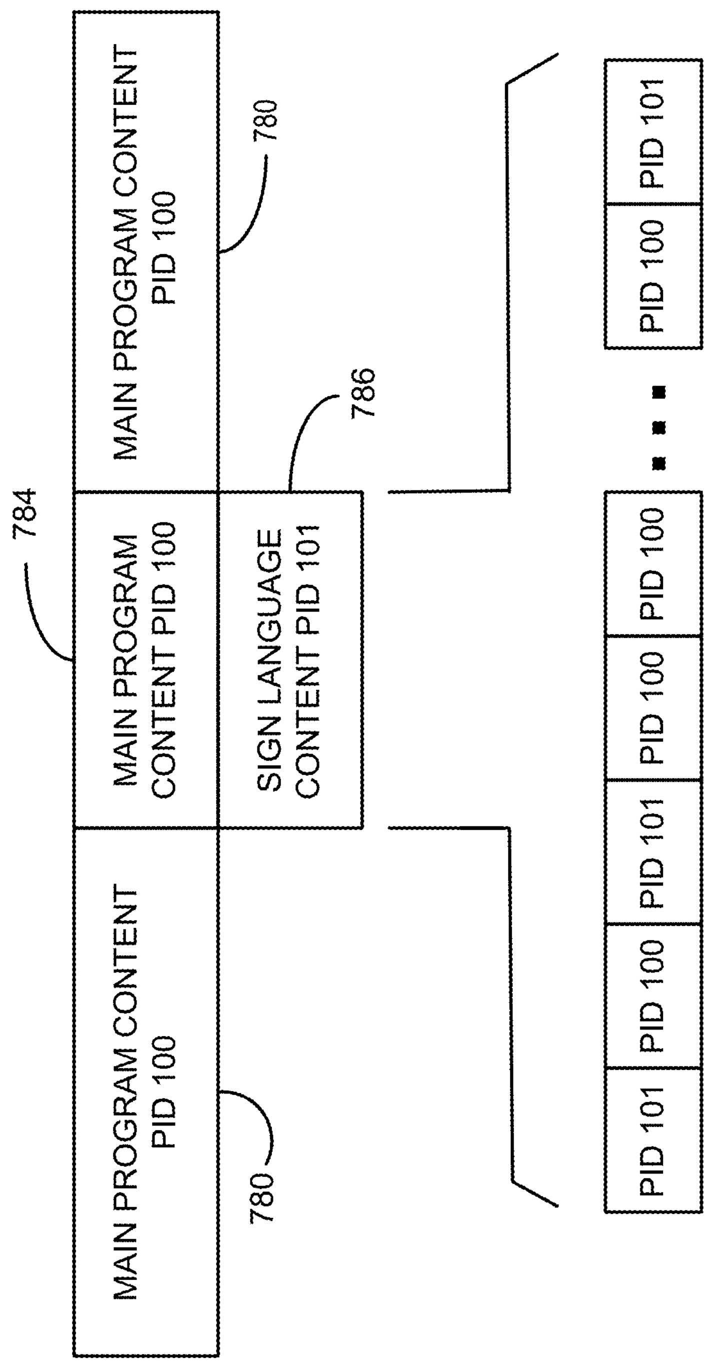
FIG. 22 is depicts an example data arrangement consistent with certain example embodiments of the present invention.

In the above discussion, multiple locations were reserved for placement of sign language content. In another embodiment consistent with the present teachings, the location or locations can be a single location that is specified during the encoding process. A data configuration for this embodiment is depicted in FIG. 22 in which normal main program content is again shown as having PID 100 and sign language content is shown having PID 101. In this example, the main program content 780 is encoded normally and primarily includes content outside of the sign language window location. The sign language window location is encoded using both the main program content at 784 and the sign language content at 786. The sign language content, as depicted in the packet breakdown at the bottom of the illustration, is interwoven into the main program content to provide for replacement of the content on a packet-for-packet basis using the packet replacement provisions of the state machine described above. Advantageously, sign language content packet can immediately precede the main content packet that will be replaced in the event sign language display is enabled. This allows the sign language packet to be buffered and ready for replacement operations when the sign language display is enabled.

While multiple locations could be provided for, each location could contribute to the amount of data transmitted. In this example, packet buffer of only a single packet in size can be used to buffer the sign language packets. The location for the sign language can be anywhere on the screen as determined by the encoder and could even change dynamically to keep the sign language window in a location that is minimally disruptive of the main content image. Moreover, multiple sign language frames could be displayed with, for example, one interpreter provided for each speaker in the main content image. Other variations will occur to those skilled in the art upon consideration of the present teachings.

The example data arrangement has a stream of packets that alternate between the main program content and the packet of sign language video content that is to replace that main content packet. The order of the packets can advantageously be as depicted but may also be provided with the main and sign language packets reversed or provided in other arrangements as desired.

In this example, the user can make a selection using a remote controller or using a menu selection, etc. to have the sign language either enabled or disabled as desired. When enabled, the decoder is instructed to carry out the packet substitution process to substitute, e.g., the PID 101 packets for the corresponding PID 100 packets. When disabled, no substitution takes place. In this manner, the user is able to exercise control over the presence or absence of the sign language content. Many variations will occur to those skilled in the art upon consideration of the present teachings.

Figure 23:
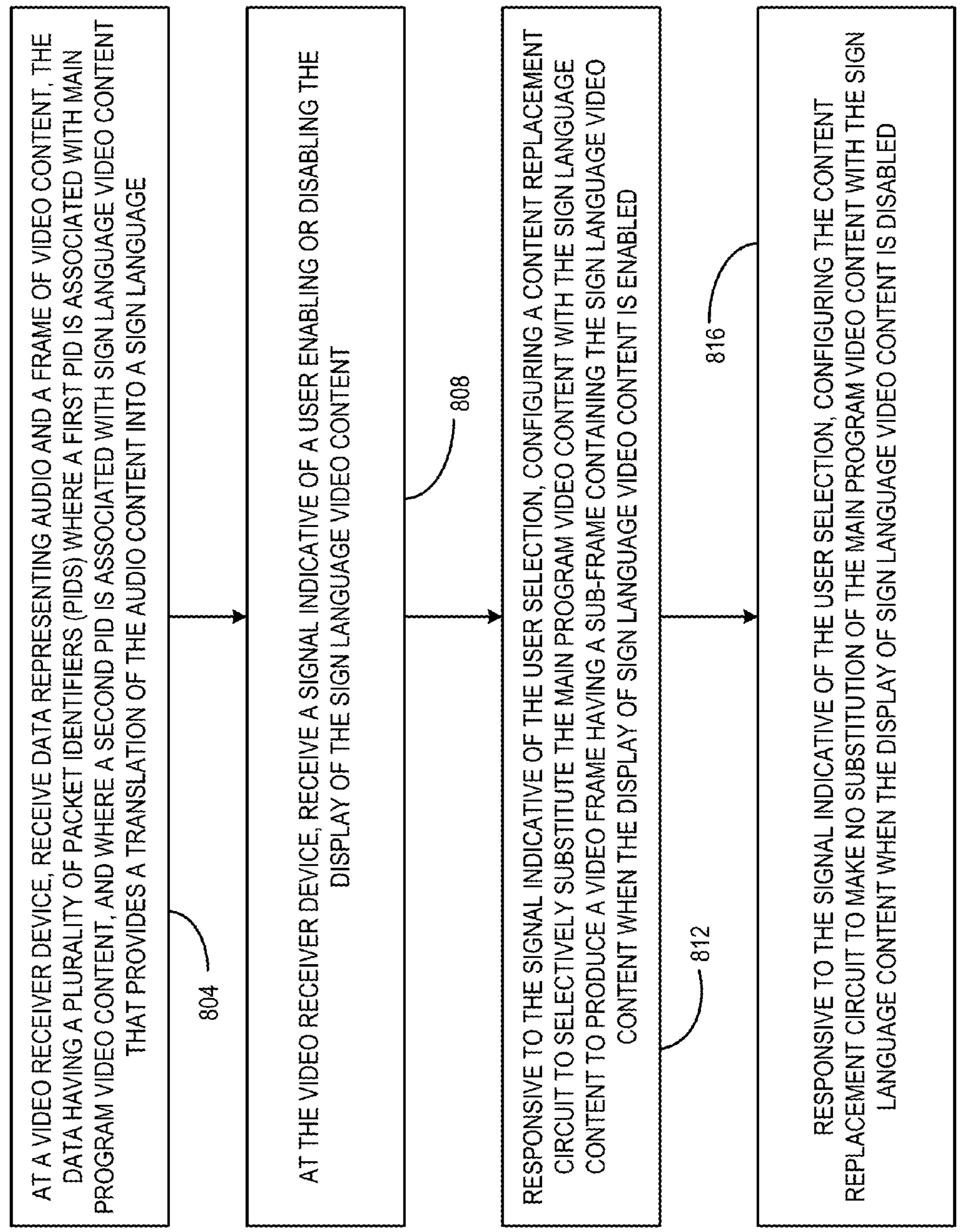
FIG. 23 is a flow chart depicting an example decoding process consistent with certain example embodiments of the present invention.

Thus, with reference to FIG. 23, a method of selectively supplementing main program video content with a sign language translation involves, at a video receiver device, at 804 receiving data representing audio and a frame of video content, the data having a plurality of packet identifiers (PIDs) where a first PID is associated with main program video content, and where a second PID is associated with sign language video content that provides a translation of the audio content into a sign language. At the video receiver device, the receiver device receives a signal indicative of a user enabling or disabling the display of the sign language video content at 808. Responsive to the signal indicative of the user selection, a content replacement circuit is configured to selectively substitute the main program video content with the sign language content to produce a video frame having a sub-frame containing the sign language video content when the display of sign language video content is enabled at 812. Responsive to the signal indicative of the user selection, the content replacement circuit is configured to make no substitution of the main program video content with the sign language content when the display of sign language video content is disabled at 816.

In another implementation packet swapping is not used. Instead, a second video stream of lower resolution essentially as a separate channel that is linked to the main video channel is provided that can be superimposed upon the main video. This implementation operates in a manner similar to "picture-in-picture". The disadvantage of this scheme is that two video decoders would be used which may result in increased licensing fees.

Thus, an example apparatus for selectively supplementing main program video content with a sign language translation has a video receiver device configured to receive data representing audio and a frame of video content, the data having a plurality of packet identifiers (PIDs) where a first PID is associated with main program video content, and where a second PID is associated with sign language video content that provides a translation of the audio content into a sign language. A user interface forms a part of the video receiver device, configured to produce a signal indicative of a user enabling or disabling the display of the sign language video content. A content replacement circuit forms a part of the video receiver device. Responsive to the signal indicative of the user selection, the content replacement circuit is configured to selectively substitute the main program video content with the sign language content to produce a video frame having a sub-frame containing the sign language video content when the display of sign language video content is enabled. Responsive to the signal indicative of the user selection, the content replacement circuit is configured to make no substitution of the main program video content with the sign language content when the display of sign language video content is disabled.

In certain example embodiments, the sign language video content is inter-coded so as to rely only on sign language video data present within the sign language video content. In certain example embodiments, the content replacement circuit comprises a hardware content replacement state machine. In certain example embodiments, a buffer is sized to store a single unit of the sign language video content, where the single unit comprises one of a packet of sign language video content, a sub-frame of sign language video content and a slice of sign language video content. In certain example embodiments, the main program video content comprises frames of video content in which a sign language window location is processed to accept substitution of the sign language video content. In certain example embodiments, the received data is ordered so that the sign language video content is received in advance of the data that encodes main program content video at a location that is processed to accept substitution of the sign language video content. In certain example embodiments, the sign language video content has a lower frame rate than the main program A/V content. In certain example embodiments, the apparatus forms a part of a television Set-top box. In certain example embodiments, the main program content and the sign language content comprise one of streamed data, a data file or a packaged medium containing a data file.

Another example apparatus for selectively supplementing main program video content with a sign language translation has a video receiver device configured to receive data representing audio and a frame of video content, the data has a plurality of packet identifiers (PIDs) where a first PID is associated with main program video content, and where a second PID is associated with sign language video content that provides a translation of the audio content into a sign language. A content replacement circuit has a hardware state machine forming a part of the video receiver device. A user interface forms a part of the video receiver device, configured to produce a signal indicative of a user enabling or disabling the display of the sign language video content. One or more programmed processors are responsive to the signal produced by the user interface to control the content replacement circuit to: configure the content replacement circuit to selectively substitute the main program video content with the sign language content to produce a video frame having a sub-frame containing the sign language video content when the signal is indicative that display of sign language video content is enabled; and configure the content replacement circuit to make no substitution of the main program video content with the sign language content when the signal is indicative that the display of sign language video content is disabled.

In certain example embodiments, the sign language video content is inter-coded so as to rely only on sign language video data present within the sign language video content. In certain example embodiments, a buffer is sized to store a single unit of the sign language video content, where the single unit comprises one of a packet of sign language video content, a sub-frame of sign language video content and a slice of sign language video content. In certain example embodiments, the main program video content has frames of video content in which a sign language window location is processed to accept substitution of the sign language video content. In certain example embodiments, the received data is ordered so that the sign language video content is received in advance of the data that encodes main program content video at a location that is processed to accept substitution of the sign language video content. In certain example embodiments, the sign language video content has a lower frame rate than the main program A/V content. In certain example embodiments, the apparatus forms a part of a television Set-top box.

An example of a method of selectively supplementing main program video content with a sign language translation involves: at a video receiver device, receiving data representing audio and a frame of video content, the data having a plurality of packet identifiers (PIDs) where a first PID is associated with main program video content, and where a second PID is associated with sign language video content that provides an interpretation of the audio content as a sign language; at the video receiver device, receiving a signal indicative of a user enabling or disabling the display of the sign language video content; and responsive to the signal indicative of the user selection, configuring a content replacement circuit to selectively substitute the main program video content with the sign language content to produce a video frame having a sub-frame containing the sign language video content when the display of sign language video content is enabled; and responsive to the signal indicative of the user selection, configuring the content replacement circuit to make no substitution of the main program video content with the sign language content when the display of sign language video content is disabled.

In certain example embodiments, the sign language video content is inter-coded so as to rely only on sign language video data present within the sign language video content. In certain example embodiments, the main program video content comprises frames of video content in which a predetermined location is processed to accept substitution of the sign language video content. In certain example embodiments, the content replacement circuit includes a hardware content replacement state machine. In certain example embodiments, the process further involves storing a single unit of sign language video content to a buffer sized to store the single unit of the sign language video content, where the single unit comprises one of a sub-frame of sign language video content and a slice of sign language video content. In certain example embodiments, the received data is ordered so that the sign language video content is received in advance of the data that encodes main program content video at a location that is processed to accept substitution of the sign language video content. In certain example embodiments, the sign language video content has a lower frame rate than the main program A/V content. In certain example embodiments, the apparatus forms a part of a television Set-top box. In certain example embodiments, the main program content and the sign language content comprise one of streamed data, a data file or a packaged medium containing a data file.

An example of a video encoder for encoding digital video with a selectable sign language image consistent with certain embodiments has a source of main program audio/video (A/V) content and a source of sign language video content corresponding to audio of the main program A/V content. The sign language video content is scaled in size and resolution to fit within a sign language window. A packet identifier (PID) mapper that is configured to map a first PID to the video portion of the main program A/V content and maps a second PID to the sign language video content. A re-encoder is configured to re-encode the main program A/V content to establish a pre-defined display location designated for a sign language window. A multiplexer is configured to receive and multiplex the re-encoded main program A/V content and the sign language video content to produce a unified data structure containing the re-encoded main program A/V content and the sign language video content.

In certain example embodiments, the pre-defined display location is inter-coded by the re-encoder so as to rely only on information present within the pre-defined location. In certain example embodiments, the sign language video content is inter-coded so as to rely only on sign language video data present within the sign language video content. In certain example embodiments, the multiplexer multiplexes the data so that the sign language video content is situated in advance of the data that encodes main program content video at the pre-defined location that is processed to accept substitution of the sign language video content. In certain example embodiments, the multiplexer further multiplexes system information with the sign language content and the main program A/V content. In certain example embodiments, a time synchronizer provides time codes to the sign language video content data and to the main program A/V content data, where the same time codes are used for both the sign language video content data and the main program A/V video content data. In certain example embodiments, the re-encoder is configured to re-encode the main program A/V content for a packet-by-packet substitution; and where the multiplexer interleaves the sign language video content with the re-encoded main program A/V content with a sign language video packet preceding a corresponding main program A/V content packet that is designated for replacement by the sign language video packet. In certain example embodiments, the sign language video content has a lower frame rate than the main program A/V content. In certain example embodiments, the main program content and the sign language content comprise one of streamed data, a data file or a packaged medium containing a data file.

Figure 24:
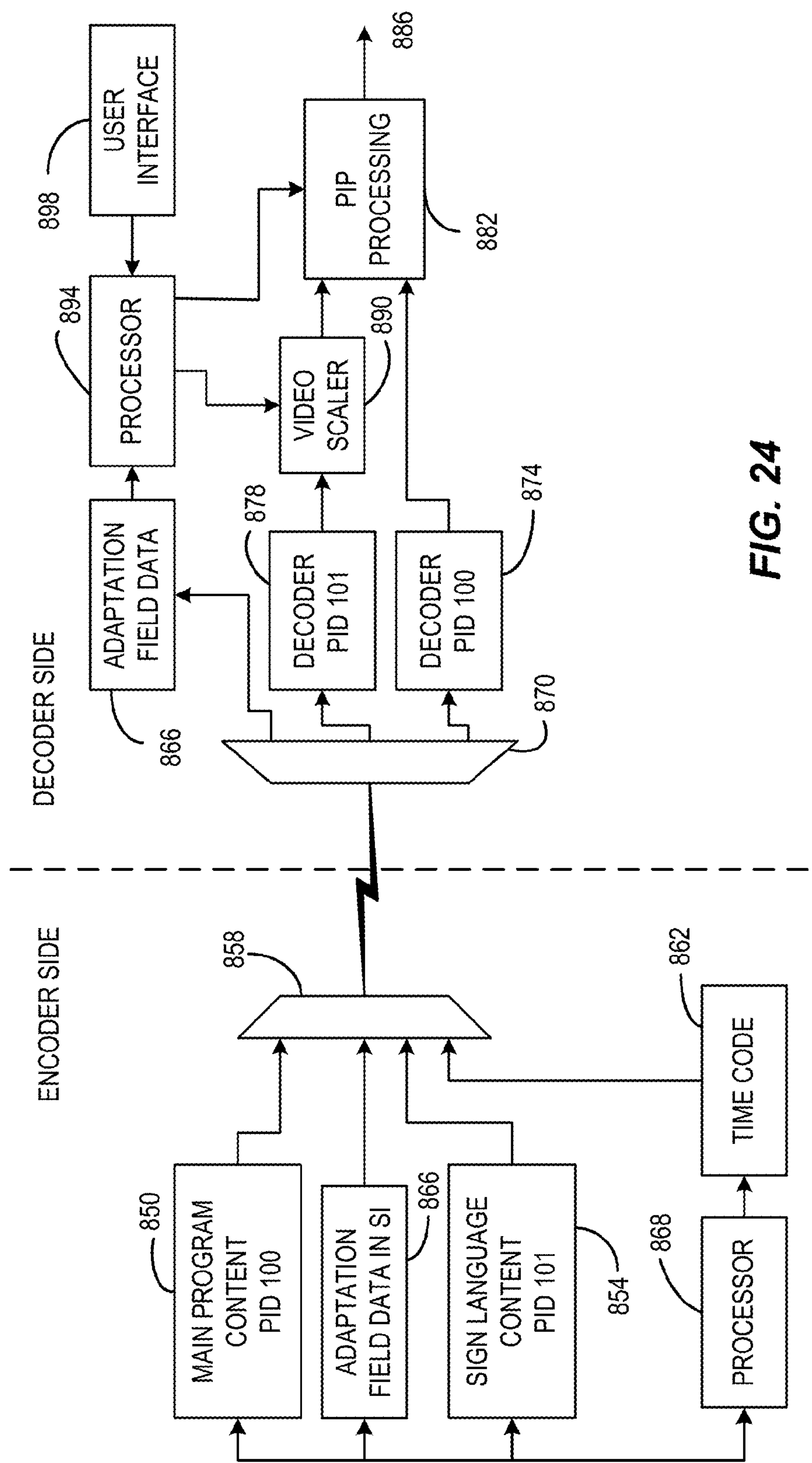
FIG. 24 is an example system block diagram consistent with certain example embodiments of the present invention.

Referring to FIG. 24, in this implementation, the main program content 850 and the sign language content 854 are multiplexed together as two separate programs at 858 at an encoder side. The sign language content is scaled to an appropriate size for presentation in a SLW which is in this example the size of a picture-in-picture window. The main content and the sign language content can be encoded with the same time codes 862 for use in synchronization at the decoder side. In one embodiment, adaptation field data 866 (user private data) can be used to link the main program content with the associated sign language content under control of processor 868 which controls the encoding process. This multiplex is then sent to the receiver at the decoder side (e.g., a television STB or other television receiver device).

At the decoder side, the received multiplex is demultiplexed at 870 into two program streams based upon the PID values of the two streams. The two streams are then decoded at decoder 874 for the main program content and decoder 878 for the sign language content. The content is then processed using picture-in-picture processing 882 to produce an output 886 that has the sign language content overlaying the main program content in the PIP window.

With conventional PIP, the content that appears in the PIP window is scaled down at a video scaling circuit 890 from full resolution (e.g., high definition or standard definition) to a size appropriate for the PIP window overlay (e.g., about ⅛ to 1/10 the size of the main program image). However, in this embodiment, the sign language window is already encoded as reduced size image (e.g., ⅛-1/10 the size of the main program). Hence, with the adaptation field linking the main content and the sign language content, the linking information is passed using the adaptation field data 866 to processor 894. At processor 894, the adaptation data are interpreted to determine that the sign language content is already a reduced size and need not be scaled at video scaler 890. Accordingly, processor 894 disables video scaling at 890 to allow the reduced size image of the sign language content to pass unsealed to the PIP processing at 882. In addition, conventional PIP processing often allows for switching places between main content and the PIP content. Since it might not be desirable to display the lower resolution sign language content as the main video image, the processor 894 may also, in certain embodiments, lock the PIP window to the sign language content and lock the larger image to the main program content. Other variations will occur to those skilled in the art upon consideration of the present teachings.

Thus, an apparatus for selectively supplementing main program video content with a sign language translation consistent with certain implementations has a video receiver device configured to receive data representing audio/video (A/V) content as a part of main program content having a first packet identifier (PID). The video receiver device is further configured to receive sign language video content data representing a sign language interpretation of the audio content having a second PID. A user interface forms a part of the video receiver device, configured to produce a signal indicative of a user enabling or disabling the display of the sign language video content. A picture-in-picture (PIP) circuit is configured to selectively generate a display of a picture-in-picture window overlaying the main program content with the sign language video content. A video scaler is configured to selectively down-scale an input signal to a size of the PIP window. A processor is configured to control the PIP circuit and the video scaler. Responsive to the signal indicative of the user enabling display of the sign language video in the PIP window, the video scaler is disabled and the PIP circuit is enabled. Responsive to the signal indicative of the user disabling display of the sign language video in the PIP window, the PIP circuit is disabled.

In certain example implementations, the received data is ordered so that the sign language video content is received in advance of the data that encodes main program content. In certain example implementations, the sign language content is synchronized to the main program content by use of the same time codes in the main program content and the sign language content. In certain example implementations, the processor is configured to determine that the main program content and the sign language program content are linked by reading adaptation field data. In certain example implementations, a demultiplexer separates the main program content from the sign language content based upon their respective PID values. In certain example implementations, the sign language video content has a lower frame rate than the main program A/V content. In certain example implementations, the apparatus forms a part of a television set. In certain example implementations, the main program content and the sign language content comprise one of streamed data, a data file or a packaged medium containing a data file.

A video encoder consistent with certain example embodiments for encoding digital video with a selectable sign language image has a source of main program audio/video (A/V) content and a source of sign language video content corresponding to audio of the main program A/V content. The sign language video content is scaled in size and resolution to fit within a sign language window. A packet identifier (PID) mapper is configured to map a first PID to the video portion of the main program A/V content and maps a second PID to the sign language video content. A processor is configured to generate an adaptation field with user private data as a part of system information that links the main video content having the first PID with the sign language video content having the second PID. A re-encoder is configured to re-encode the main program A/V content to establish a pre-defined display location designated for a sign language window. A multiplexer is configured to receive and multiplex the main program A/V content and the sign language video content and the system information contacting the adaptation field as an output.

In certain example implementations, the sign language video content has a lower frame rate than the main program A/V content. In certain example implementations, the multiplexer multiplexes the data so that the sign language video content is situated in advance of the data that encodes main program content video. In certain example implementations, a time synchronizer that provides time codes to the sign language video content data and to the main program A/V content data, where the same time codes are used for both the sign language video content data and the main program A/V video content data. In certain example implementations, the main program content and the sign language content comprise one of streamed data, a data file or a packaged medium containing a data file.

Figure 25:
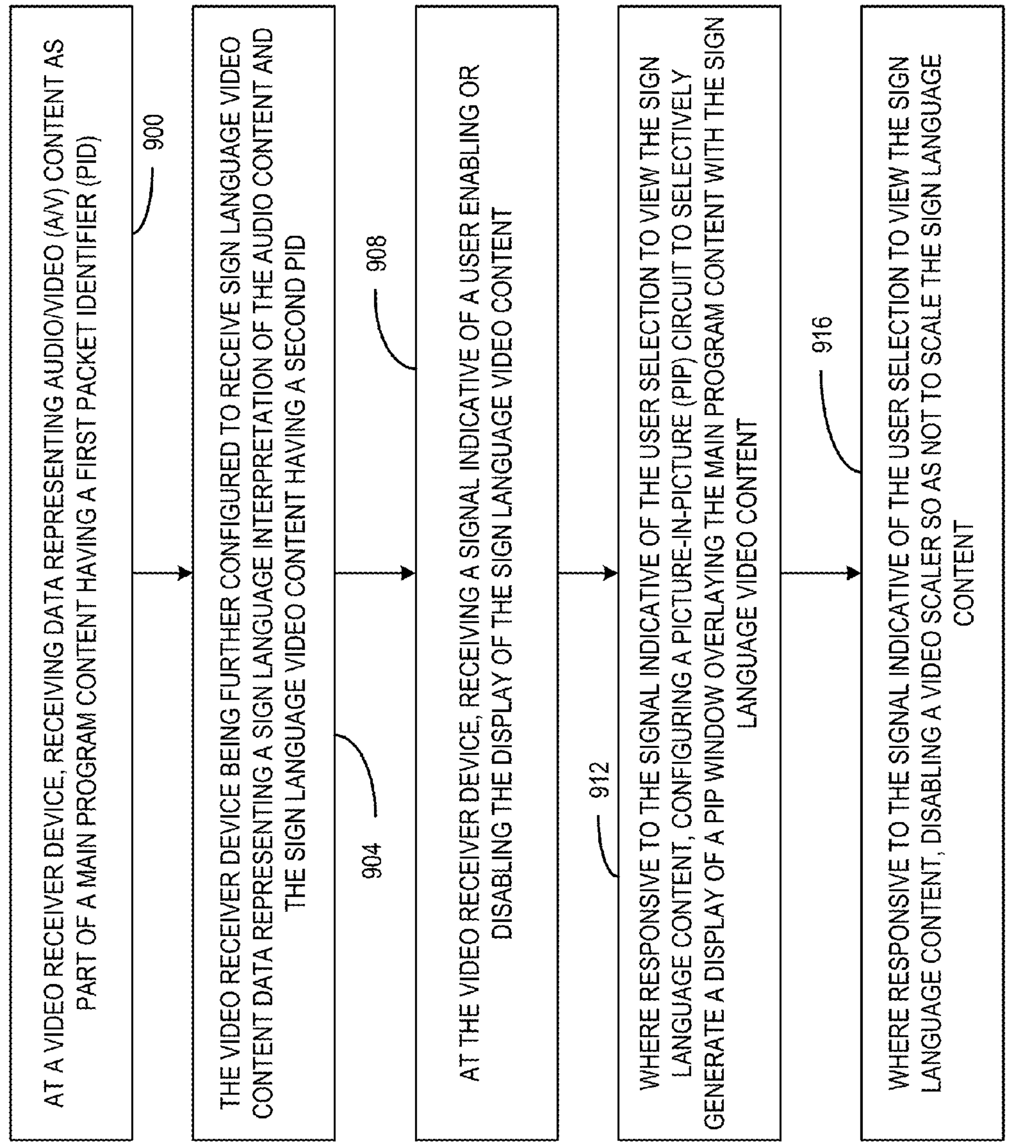
FIG. 25 is a flow chart of an example implementation process consistent with certain example embodiments of the present invention.

Referring to FIG. 25, a method of selectively supplementing main program video content with a sign language interpretation involves at a video receiver device, receiving data representing audio/video (A/V) content as part of a main program content having a first packet identifier (PID) at 900. The video receiver device is further configured to receive sign language video content data representing a sign language interpretation of the audio content and the sign language video content having a second PID at 904. At the video receiver device, a signal is received at 908 indicative of a user enabling or disabling the display of the sign language video content. Responsive to the signal indicative of the user selection to view the sign language content at 912, a picture-in-picture (PIP) circuit is configured to selectively generate a display of a PIP window overlaying the main program content with the sign language video content. Responsive to the signal indicative of the user selection to view the sign language content, a video scaler is disabled so as not to scale the sign language content at 916.

Thus, a method of selectively supplementing main program video content with a sign language interpretation involves at a video receiver device, receiving data representing audio/video (A/V) content as part of a main program content having a first packet identifier (PID). The video receiver device is further configured to receive sign language video content data representing a sign language interpretation of the audio content and the sign language video content having a second PID. At the video receiver device, a signal indicative of a user enabling or disabling the display of the sign language video content is received. Responsive to the signal indicative of the user selection to view the sign language content, a picture-in-picture (PIP) circuit is configured to selectively generate a display of a PIP window overlaying the main program content with the sign language video content. Responsive to the signal indicative of the user selection to view the sign language content, a video scaler is disabled so as not to scale the sign language content.

In certain example implementations, responsive to the signal indicative of the user selection not to view the sign language content, disabling the PIP circuit so as to make no overlay of the main program video content with the sign language content. In certain example implementations, responsive to the signal indicative of the user selection not to view the sign language content, enabling the video scaler. In certain example implementations, the received data is ordered so that the sign language video content is received in advance of the main program content video content In certain example implementations, the sign language content is synchronized to the main program content by use of the same time codes in the main program content and the sign language content. In certain example implementations, the process further involves determining that the main program content and the sign language program content are linked by reading adaptation field data. In certain example implementations, the sign language video content has a lower frame rate than the main program A/V content. In certain example implementations, the method is carried out within a television set.

Figure 26:
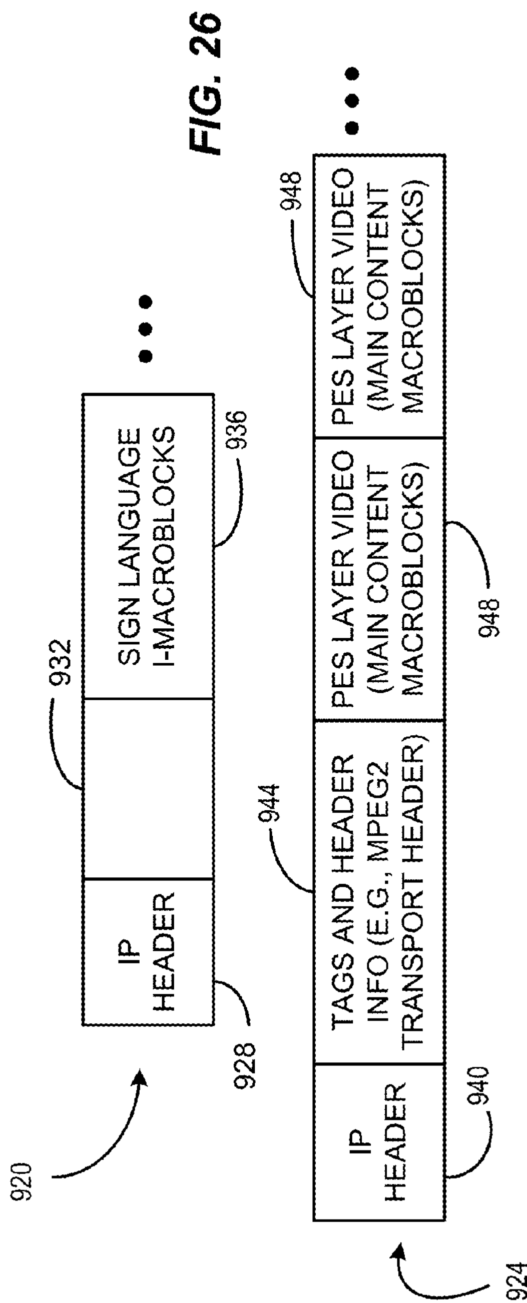
FIG. 26 illustrates a packet arrangement for an example implementation in which sign language is communicated with separate IP packets from the main program content in a manner consistent with certain example embodiments of the present invention.

Referring now to FIG. 26, it is noted that there are several ways in which the sign language content and the main program content can be conveyed from encoder side to decoder side. In one case as depicted, a stream of video can be encoded such that the sign language stream 920 is separate from the main content stream 924. In this example, a separate packet or set of packets is provided for the sign language content including an IP header 928, followed by a field that identifies the stream, consisting of tag and header info 932. The subsequent data 936 represents the sign language content, e.g., encoded as I-macroblocks or otherwise encoded as freestanding data.

A separate set of packets 924 are used in this example starting with an IP header 940 which is followed by tags and header information such, for example and MPEG-2 transport stream header 944. This header 944 is followed by one or more packetized elementary stream (PES) layer video packets carrying a payload of the main program content.

Figure 27:
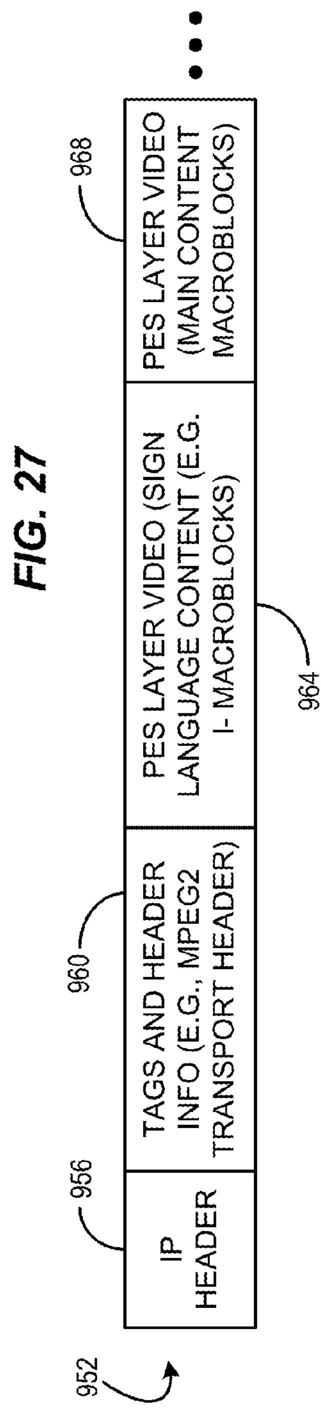
FIG. 27 illustrates a packet arrangement for an example implementation in which sign language is communicated within the same IP packets as the main program content in a manner consistent with certain example embodiments of the present invention.

In an alternative implementation, both the main program content and the sign language content can be transported using the same IP packets as depicted in FIG. 27. Here, the data stream 952 is arranged with an IP header 956 followed by tags and header information 960, e.g., for an MPEG-2 transport. This is followed by PES layer video representing the sign language video content such as I-macroblocks at 964 so that the sign language data precedes the main program content data which is presented in PES layer video at 968. In this manner the main program content and the sign language content can be merged together which helps link the content together and helps assure that the sign language content arrives first for buffering so as to be readily substituted for the main program content. Other variations will occur to those skilled in the art upon consideration of the present teachings.

Figure 28:
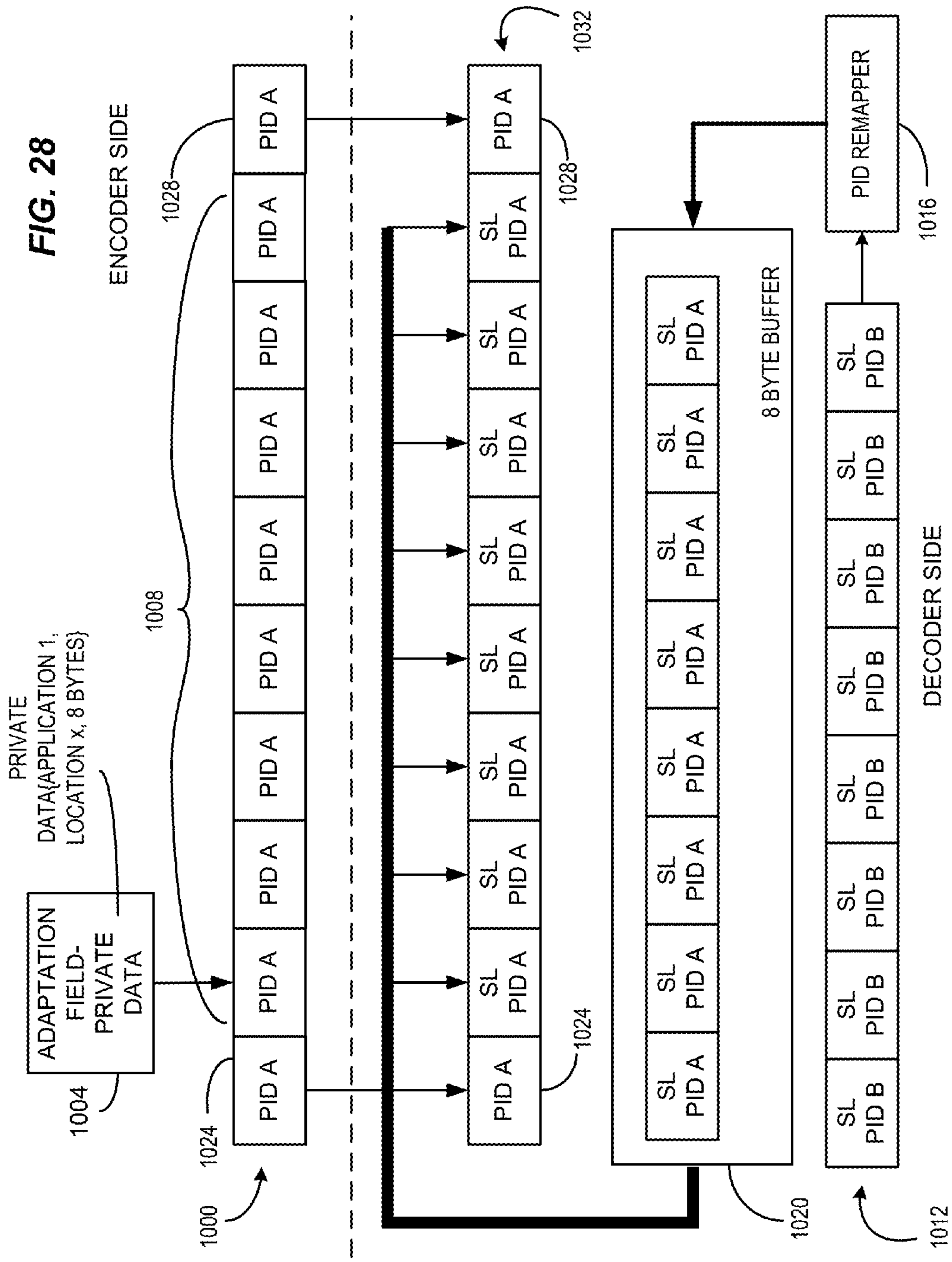
FIG. 28 illustrates packet substitution carried out in a manner consistent with certain example embodiments of the present invention.

Referring now to FIG. 28, the content substitution process as described above in connection with the non-PIP implementations is depicted. For this example, the main program content is shown as 1000 with each of the blocks representing content having PID A, identifying the content as main program content. In this example, the sign language replacement location is provided as private data in an adaptation field 1004. In this example, the private data designates an application to use for the substitution process and a location and number of bytes to substitute (8 bytes in this example). The bytes that are to be substituted are shown as 1008. In this manner, the encoder side generates the data stream 1000 and the adaptation field 1004 that designates the content that is to be replaced.

At the decoder side, the sign language content (identified by "SL") is received as stream 1012 which at this point is identified by PID B. The PID value of this sign language content is then remapped at PID remapper 1016 and the remapped sign language content, now bearing PID A, is stored in an 8 byte buffer 1020 (sized to match the amount of content to be replaced). When the state machine content substitution circuit makes the content substitution, the contents of the buffer 1020 is inserted into the stream to replace the packets designated as 1008. Packets outside the bounds of this 8 byte segment 1008 such as 1024 and 1028 are unchanged and the output of this process is the stream shown as 1032.

In each of the embodiments discussed above, a lower frame rate can be used for the sign language data in order to further reduce the size of the data that represents the sign language content. For example, the main data may be encoded with a frame rate of 60 or 120 frames per second (fps). The sign language can be encoded with a 30 fps frame rate and provide acceptable performance for display of the sign language window while reducing the amount of data that are encoded and transmitted. Other variations will occur to those skilled in the art upon consideration of the present teachings.

Thus, content substitution and/or picture-in-picture technology is used to provide a sign language window that provides a sign language interpretation of audio content in main program audio/video content. The sign language window can be selectively disabled by a user that does not wish to view the sign language video. Also, in some implementations, the user can move the sign language window to a desired location on the display. The desired location may be one of a plurality of pre-defined display locations. Other variations will occur to those skilled in the art upon consideration of the present teachings.

Those skilled in the art will recognize that the present invention has been described in terms of exemplary embodiments that utilize a programmed processor (e.g., processors 416, 458, 744, 868 and 894). However, the invention should not be so limited, since the present invention could be implemented using hardware component equivalents such as special purpose hardware and/or dedicated processors that are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Conversely, certain devices have been described in terms of a state machine and such state machine can be implemented as either a hardware or software based state machine. Moreover, those skilled in the art will understand that many details described in connection with the above exemplary embodiments should not be considered limiting, but are presented by way of illustration.

Those skilled in the art will appreciate that the program operations and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, may be implemented using a programmed processor executing programming instructions that are broadly described above form that can be stored on any suitable electronic storage medium or otherwise be present in any computer readable medium. However, those skilled in the art will appreciate that the processes described above can be implemented in any number of variations and in many suitable programming languages or with hardware equivalents without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any non-transitory computer readable medium or storage medium including, but not limited to, electronic storage devices such as those described above, as well as optical signals and other media that stores code and/or data. In the present exemplary embodiments, MPEG compliant packets, slices, macroblocks, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the claims.

What is claimed is:

1. An apparatus comprising:

at least one video receiver device configured to receive data representing audio/video (A/V) content as a part of main program content having a first packet identifier (PID) and to receive sign language video content data representing a sign language interpretation of the audio content having a second PID;

the video receiver device including at least one computer memory comprising instructions executable by at least one processor to:

receive user input for enabling or disabling a display of the sign language video content;

present at least one picture-in-picture (PIP) window presenting the main program content with the sign language video content;

down-scale an input signal to a size of the PIP window;

responsive to receiving user input enabling display of the sign language video in the PIP window, disable downscaling of the input signal to a size of the PIP window and enable presenting the PIP window; and responsive to receiving user input disabling display of the PIP window, disable the PIP window and enable downscaling of the input signal, the PIP window having a location, the instructions executable to:

determine whether the location is a last location in a sequence of locations;

responsive to determining the location is the last location, stop presenting the PIP window; and responsive to determining the location is not the last location, move the window to a next location in the sequence of locations.

2. The apparatus according to claim 1, wherein the instructions are executable to order the received data so that the sign language video content is received in advance of data that encodes main program content.

3. The apparatus according to claim 1, wherein the instructions are executable to synchronize the sign language video content to the main program content by use of the same time codes in the main program content and the sign language video content.

4. The apparatus according to claim 1, wherein the instructions are executable to determine that the main program content and the sign language video content are linked based on reading adaptation field data.

5. The apparatus according to claim 1, further comprising a demultiplexer that separates the main program content from the sign language content based upon their respective PID values.

6. The apparatus according to claim 1, wherein the sign language video content has a lower frame rate than the main program A/V content.

7. The apparatus according to claim 1, wherein the apparatus forms a part of a television set.

8. The apparatus according to claim 1, wherein the main program content and the sign language video content comprise one of streamed data, a data file or a packaged medium containing a data file.

9. A method of selectively supplementing main program video content with a sign language interpretation, comprising:

using a video receiver device, receiving data representing audio/video (A/V) content as part of a main program content having a first packet identifier (PID);

using the video receiver device, receiving sign language video content data representing a sign language interpretation of the audio content and the sign language video content having a second PID;

using the video receiver device, receiving a signal indicative of a user enabling or disabling display of the sign language video content;

responsive to the signal indicative of the user selection to view the sign language content, configuring a picture-in-picture (PIP) circuit to selectively generate a display of a PIP window overlaying the main program content with the sign language video content;

receiving a video frame of the A/V content, the video frame including plural macroblocks;

determining whether a first macroblock in the plural macroblocks is at a boundary of the PIP window;

responsive to the first macroblock not being at a boundary of the PIP window, not re-encoding the sign language content and outputting the first macroblock;

responsive to the first macroblock being at a boundary of the window, determining whether the boundary is a first boundary or a second boundary;

responsive to the boundary being the first boundary, re-encoding the first macroblock responsive to the first macroblock not being an I-macroblock, and not re-encoding the first macroblock responsive to the first macroblock being an I-macroblock;

responsive to the boundary being the second boundary, not re-encoding the first macroblock responsive to the first macroblock being an I-macroblock, and responsive to the first macroblock not being an I-macroblock, re-encoding the first macroblock as an I-macroblock.

10. The method according to claim 9, comprising:

responsive to the signal indicative of the user selection not to view the sign language content, disabling the PIP circuit so as to make no overlay of the main program video content with the sign language video content.

11. The method according to claim 9, comprising ordering the received data so that the sign language video content is received in advance of the main program content video content.

12. The method according to claim 9, comprising synchronizing the sign language content to the main program content by use of same time codes in the main program content and the sign language content.

13. The method according to claim 9, further comprising determining that the main program content and the sign language video content are linked by reading adaptation field data.

14. The method according to claim 9, wherein the sign language video content has a lower frame rate than the main program A/V content.

15. The method according to claim 9, comprising:

responsive to the signal indicative of the user selection to view the sign language video, disabling a video scaler so as not to scale the sign language video; and responsive to the signal indicative of the user selection not to view the sign language video, enabling the video scaler.

16. A video encoder comprising:

an input configured to receive main program audio/video (A/V) content;

the video encoder also configured to receive sign language video content corresponding to audio of the main program A/V content;

the sign language video content being scaled in size and resolution to fit within a sign language window;

a packet identifier (PID) mapper that is configured to map a first PID to a video portion of the main program A/V content and maps a second PID to the sign language video content;

a processor that is configured to correlate the main video content having the first PID with the sign language video content having the second PID;

a re-encoder that is configured to re-encode the main program A/V content to establish a pre-defined display location designated for a sign language window (SLW); and a multiplexer configured to multiplex the main program A/V content and the sign language video content;

the video encoder being configured to:

responsive to a received macroblock that is a first type of non-I-macroblock being at a first edge of the SLW, re-encode the received macroblock as an I-macroblock; and responsive to a received macroblock that is a second type of non-I-macroblock being at a first edge of the SLW, not re-encode the received macroblock as an I-macroblock.

17. The video encoder according to claim 16, wherein the sign language video content has a lower frame rate than the main program A/V content.

18. The video encoder according to claim 16, further comprising a time synchronizer that provides time codes to the sign language video content data and to the main program A/V content data, wherein same time codes are used for both the sign language video content data and the main program A/V video content data.

19. The video encoder according to claim 16, wherein the main program content and the sign language content comprise one of streamed data, a data file or a packaged medium containing a data file.

20. The video encoder of claim 16, wherein the multiplexer multiplexes data so that the sign language video content is situated in advance of the data that encodes main program content video.

21. The video encoder of claim 16, wherein the processor is configured to generate an adaptation field with user private data as a part of system information that correlates the main video content having the first PID with the sign language video content having the second PID.

* * * * *